(12) United States Patent
Muñoz De La Torre Alonso et al.

(10) Patent No.: US 12,739,224 B2
(45) Date of Patent: Sep. 15, 2026

(54) METHODS FOR HANDLING USAGE OF A DOMAIN NAME SERVICE AND CORRESPONDING DEVICES

(71) Applicant: Telefonaktiebolaget LM Ericsson (publ), Stockholm (SE)

(72) Inventors: Miguel Angel Muñoz De La Torre Alonso, Madrid (ES); Rodrigo Alvarez Dominguez, Madrid (ES); Miguel Angel Puente Pestaña, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 32 days.

(21) Appl. No.: 18/031,220

(22) PCT Filed: Nov. 10, 2020

(86) PCT No.: PCT/EP2020/081626
§ 371 (c)(1),
(2) Date: Apr. 11, 2023

(87) PCT Pub. No.: WO2022/083883
PCT Pub. Date: Apr. 28, 2022

(65) Prior Publication Data

US 2023/0379293 A1 Nov. 23, 2023

(30) Foreign Application Priority Data

Oct. 22, 2020 (EP) .................................... 20382921

(51) Int. Cl.
*H04L 61/4511* (2022.01)
*H04L 61/2557* (2022.01)
*H04L 101/69* (2022.01)

(52) U.S. Cl.
CPC ...... *H04L 61/4511* (2022.05); *H04L 61/2557* (2013.01); *H04L 2101/69* (2022.05)

(58) Field of Classification Search
CPC ............. H04L 61/4511; H04L 61/2557; H04L 2101/69; H04L 67/34
See application file for complete search history.

(56) References Cited

U.S. PATENT DOCUMENTS 9,713,082 B2 * 7/2017 Zhang ................. H04L 12/1407
2013/0262676 A1 * 10/2013 Kang .................. H04L 63/1483
709/225

(Continued)

OTHER PUBLICATIONS

3rd Generation Partnership Project, "3rd Generation Partnership Project; Technical Specification Group Core Network and Terminals; User Equipment (UE) policies for 5G System (5GS); Stage 3 (Release 16)", Technical Specification, 3GPP TS 24.526 V16.4.0, Jun. 2020, pp. 1-52, 3GPP.

(Continued)

*Primary Examiner* — Joe Chacko
(74) *Attorney, Agent, or Firm* — COATS & BENNETT, PLLC

(57) ABSTRACT

A method, performed by a first node (111), for handling usage of a Domain Name Service (DNS) server (121) in a communications network (100). The first node (111) obtains (301) one or more first indications. The one or more first indications indicate one or more rules on how a device (140) is to select, based on one or more criteria, a DNS server (121), out of one or more DNS servers (120) for use by the device (140) for an application. The one or more first indications comprise an explicit indication of one of: a) which applications the one or more rules apply to, and b) that the one or more rules apply to all applications. The first node (111) sends (305) a second indication to one of: another node (113) and the device (140). The second indication indicates the obtained one or more first indications.

20 Claims, 10 Drawing Sheets

(56) References Cited

U.S. PATENT DOCUMENTS

| | | | | |
|---|---|---|---|---|
| 2014/0089523 | A1* | 3/2014 | Roy | H04L 61/4511 709/242 |
| 2016/0164825 | A1* | 6/2016 | Riedel | H04L 43/026 709/223 |
| 2016/0269353 | A1* | 9/2016 | Chan | H04L 12/6418 |
| 2023/0164111 | A1* | 5/2023 | Yao | H04L 61/4511 709/245 |

OTHER PUBLICATIONS

3rd Generation Partnership Project, "3rd Generation Partnership Project; Technical Specification Group Services and System Aspects; Study on enhancement of support for Edge Computing in 5G Core network (5GC) (Release 17)", Technical Report, 3GPP TR 23.748 V1.0.0, Sep. 2020, pp. 1- 232, 3GPP.

Savolainen, T. et al., "Improved Recursive DNS Server Selection for Multi-Interfaced Nodes", Aug. 3, 2012, pp. 1-31, retrieved from Internet: https://datatracker.ietf.org/doc/draft-ietf-mif-dns-server-selection/12/.

IEEE Computer Society, "IEEE Standard for Information technology—Telecommunications and information exchange between systems—Local and metropolitan area networks—Specific requirements; Part 15.4: Wireless Medium Access Control (MAC) and Physical Layer (PHY) Specifications for Low-Rate Wireless Personal Area Networks (LR-WPANs)", IEEE Std 802.15.4™—2003, Oct. 1, 2003, pp. 1679, IEEE.

* cited by examiner a)

b)

METHODS FOR HANDLING USAGE OF A DOMAIN NAME SERVICE AND CORRESPONDING DEVICES

TECHNICAL FIELD

The present disclosure relates generally to a first node and methods performed thereby for handling usage of a Domain Name Service (DNS). The present disclosure also relates generally to a second node, and methods performed thereby for handling usage of a DNS. The present disclosure further relates generally to a device and methods performed thereby for handling usage of a DNS. The present disclosure also relates generally to computer programs and computer-readable storage mediums, having stored thereon the computer programs to carry out these methods.

BACKGROUND

Computer systems in a communications network may comprise one or more nodes, which may also be referred to simply as nodes. A node may comprise one or more processors which, together with computer program code may perform different functions and actions, a memory, a receiving port and a sending port. A node may be, for example, a server. Nodes may perform their functions entirely in the cloud.

The standardization organization 3GPP is currently in the process of specifying a New Radio Interface called NR or 5G-UTRA, as well as a Fifth Generation (5G) Packet Core Network, which may be referred to as 5G Core Network, abbreviated as 5GC.

A 3GPP system comprising a 5G Access Network (AN), a 5G Core Network and a UE may be referred to as a 5G system.

FIG. 1 is a schematic diagram depicting a particular example of a 5GC architecture as defined by 3GPP, which may be used as a reference for the present disclosure. The depicted architecture shows different types of nodes that may be comprised in a communications network. A Policy Control Function (PCF) 1 may be understood to support a unified policy framework to govern the behavior of the network. The PCF 1 may provide Policy and Charging Control (PCC) rules to the Policy and Charging Enforcement Function (PCEF). That is, the Session Management Function (SMF) 2/User Plane Function (UPF) 3 that may enforce policy and charging decisions according to provisioned PCC rules. The PCF 1 may provide policy rules to a user equipment (UE) 4 through the Access and Mobility Management Function (AMF) 5. The AMF 5 may manage access of the UE 4. For example, when the UE 4 may be connected through different access networks, and mobility aspects of the UE 4. Specifically, the AMF 5 may be used to forward UE rules from the PCF 1 to the UE 4. The SMF 2 may support different functionality, e.g. Session Establishment, modify and release, and policy related functionalities such as termination of interfaces towards Policy control functions, Charging data collection, support of charging interfaces and control and coordination of charging data collection at the UPF 3. The SMF 2 may receive PCC rules from PCF 1 and configure the UPF 3 accordingly through an N4 reference point 6 according to the Packet Flow Control Protocol (PFCP) protocol as follows. The SMF may control the packet processing in the UPF 3 by establishing, modifying or deleting PFCP Sessions and by provisioning, e.g., adding, modifying or deleting, Packet Detection Rules (PDRs), Forwarding Action Rules (FARs), Quality of Service Enforcement Rules (QERs) and/or Usage Reporting Rules (URRs) per PFCP session, whereby a PFCP session may correspond to an individual Packet Data Unit (PDU) session or a standalone PFCP session not tied to any PDU session. Each PDR may contain a Packet Detection Information (PDI) specifying the traffic filters or signatures against which incoming packets may be matched. Each PDR may be associated to the following rules providing the set of instructions to apply to packets matching the PDI. According to a first rule, one FAR, which may contain instructions related to the processing of the packets, may specifically forward, duplicate, drop or buffer the packet with or without notifying the Control Plane (CP) function about the arrival of a Downlink (DL) packet. According to a second rule, zero, one or more QERs, which contains instructions related to the Quality of Service (QoS) enforcement of the traffic. According to a third rule, zero, one or more URRs, which may contain instructions related to traffic measurement and reporting. The UPF 3 may support handling of user plane traffic based on the rules received from the SMF 2, packet inspection, e.g., through PDRs, and different enforcement actions, such as traffic steering, QoS, Charging/Reporting, e.g., through FARs, QERs and URRs. The UE 4 is a type of device. Devices within a communications network may be user equipments (UEs), e.g., stations (STAs), wireless devices, mobile terminals, wireless terminals, terminals, and/or Mobile Stations (MS). User equipments are enabled to communicate wirelessly in a cellular communications network or wireless communication network, sometimes also referred to as a cellular radio system, cellular system, or cellular network. The communication may be performed e.g., between two user equipments, between a user equipment and a regular telephone, and/or between a user equipment and a server via a Radio Access Network (RAN) 7, and possibly one or more core networks, comprised within the communications network. Devices may further be referred to as mobile telephones, cellular telephones, laptops, or tablets with wireless capability, just to mention some further examples. The devices in the present context may be, for example, portable, pocket-storable, hand-held, computer-comprised, or vehicle-mounted mobile devices, enabled to communicate voice and/or data, via the RAN 7, with another entity, such as another terminal or a server.

The communications network may cover a geographical area which may be divided into cell areas, each cell area being served by another type of node, a network node in the RAN 7, radio network node or Transmission Point (TP), for example, an access node such as a Base Station (BS), e.g. a Radio Base Station (RBS), which sometimes may be referred to as e.g., evolved Node B ("eNB"), "eNodeB", "NodeB", "B node", or Base Transceiver Station (BTS), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The telecommunications network may also be a non-cellular system, comprising network nodes which may serve receiving nodes, such as user equipments, with serving beams. Also depicted in FIG. 1 are a Network Slice Selection Function (NSSF) 8, a Network Exposure Function (NEF) 9, a Network Repository Function (NRF) 10, a Unified Data Management (UDM) 11, an Application Function (AF) 12, an Authentication Server Function (AUSF) 13 and a Data Network (DN) 14. Each of the NSSF 8, the NEF 9, the NRF 10, the PCF 1, the UDM 11, the AF 12, the AUSF 13, the AMF 5 and the SMF 2 may have an interface through which they may be accessed, which as depicted in the Figure, may be, respectively: Nnssf 15, Nnef 16, Nnrf 17, Npcf 18, Nudm 19, Naf 20, Nausf 21, Namf 22, Nsmf 23. Each of the UE 4, the RAN 7 and the UPF 3 may have an interface through which they may be accessed, which as depicted in the Figure, may be, respectively: N1 24, N2 25 and N4 6. The RAN 7 may have an interface N3 26 with the UPF 3. The UPF 3 may have an interface N6 27 with the DN 14.

Domain Name Service (DNS) and DNS Encryption

DNS may be considered as one of the fundamental building blocks of the Internet. DNS may be understood to be used any time a website is visited, an email is sent, an IM conversation is maintained, or any other task is performed online. When a user opens an application, DNS protocol may be used to retrieve the server Internet Protocol (IP) address/es for the target application domain. DNS protocol today may be usually unencrypted, that is, it may be used as DNS over User Datagram Protocol (UDP)/Transmission Control Protocol (TCP), but there may be different Internet Engineering Task Force (IETF) drafts proposing DNS encryption to prevent middle boxes to detect DNS traffic. There may be different proposals at IETF such as DNS Security Extensions (DNSSEC), DNS over HTTP/2 (DOH), DNSCrypt, Quad9, etc. It is foreseen that in the 5G time-frame, that is in the 2020-2030 decade, most DNS traffic may be encrypted.

User devices may include DNS caches that may store recently visited IP addresses before a request may be sent out to the internet. This DNS cache may suffer some security attacks such as DNS poisoning, where IP address for some domains in the cache may have an incorrect entry.

Domain Names Hierarchy

Domain Names may be hierarchical, and each part of a domain name may be referred to as either the root, Top Level Domain (TLD), second level domain, sub-domains or host name, that is, a resource record. To allow computers to properly recognize a fully qualified domain name, dots may be placed between each part of the name. The fully qualified domain name may be split into pieces at the dots, and the tree may be searched starting from the root of the hierarchical tree structure. All resolvers may start their lookups at the root; therefore, the root may be represented by a dot and may be often assumed to be there, even when not shown. The resolver may navigate its way down the tree until it may get to the last, left-most part of the domain name, and then may look within that location for the information may need. Information about a host such as its name, its IP address and occasionally even its function may be stored in one or more zone files which together may compose a larger zone often referred to as a domain.

Within the hierarchy, resolution may start at the top level domain, and work its way down to the second-level domain, then through zero, one or more sub-domains until the resolver may get to the actual host name that may be desired to resolve into an IP address.

Edge Computing (EC)

Edge computing may be understood as a distributed computing paradigm which may bring computation and data storage closer to the location where it may be needed, to improve response times and save bandwidth. 3GPP TS 23.501, v16.6.0, describes how 5G enables EC scenarios.

DNS in Edge Computing

3GPP TR 23.748, v1.0.0 describes how DNS may be used for EC in 3GPP networks. Solutions are being studied to allocate DNS servers in Edge Clouds or Local Data Networks and resolve the addresses of the applications deployed in those Edge Clouds. The existing solutions may describe the UE receiving the address of a DNS server, e.g., a local DNS server, in the PDU session establishment response message. Then, the UE may use that DNS server to resolve the addresses of the applications, e.g., using their Full Qualified Domain Name (FQDN).

UE Policies for 5G System

3GPP TS 24.526, v16.5.0 describes the UE policies for 5G system, which may be delivered from the PCF to the UE, including UE route selection policy (URSP) and Access network discovery and selection policy (ANDSP).

URSP Rules

The network, e.g., via the PCF, may install URSP rules in a UE. A URSP rule may include a traffic descriptor and a list of route selection descriptors. The traffic descriptor may include an application descriptor in the form of an application identifier. Table 1 below shows the format a URSP rule may have according to existing methods, particularly, as described in Table 6.6.2.1-2 "UE Route Selection Policy Rule" from 3GPP TS 23.503 v16.6.0.

TABLE 1

| Information name | Description | Category | PCF permitted to modify in a UE context | Scope |
|---|---|---|---|---|
| Rule Precedence | Determines the order the URSP rule is enforced in the UE. | Mandatory (NOTE 1) | Yes | UE context |
| Traffic descriptor | This part defines the Traffic descriptor components for the URSP rule. | Mandatory (NOTE 3) | | |
| Application descriptors | It consists of OSId and OSAppId(s). (NOTE 2) | Optional | Yes | UE context |
| IP descriptors (NOTE 5) | Destination IP 3 tuple(s) (IP address or IPv6 network prefix, port number, protocol ID of the protocol above IP). | Optional | Yes | UE context |
| Domain descriptors | Destination FQDN(s) or a regular expression as a domain name matching criteria. | Optional | Yes | UE context |
| Non-IP descriptors (NOTE 5) | Descriptor(s) for destination information of non-IP traffic | Optional | Yes | UE context |

TABLE 1-continued

| Information name | Description | Category | PCF permitted to modify in a UE context | Scope |
|---|---|---|---|---|
| DNN | This is matched against the DNN information provided by the application. | Optional | Yes | UE context |
| Connection Capabilities | This is matched against the information provided by a UE application when it requests a network connection with certain capabilities. (NOTE 4) | Optional | Yes | UE context |
| List of Route Selection Descriptors | A list of Route Selection Descriptors. The components of a Route Selection Descriptor are described in table 6.6.2.1-3. | Mandatory | | |

(NOTE 1):
Rules in a URSP shall have different precedence values.
(NOTE 2):
The information is used to identify the Application(s) that is(are) running on the UE's OS. The OSId does not include an OS version number. The OSAppId does not include a version number for the application.
(NOTE 3):
At least one of the Traffic descriptor components shall be present.
(NOTE 4):
The format and some values of Connection Capabilities, e.g. "ims", "mms", "internet", etc., are defined in TS 24.526 [19]. More than one connection capabilities value can be provided.
(NOTE 5):
A URSP rule cannot contain the combination of the Traffic descriptor components IP descriptors and Non-IP descriptors.

According to existing methods, DNS procedures may result in high latencies, thus impacting the quality of experience of the user, and wasted resources, such as energy resources of a device. Furthermore, Application Servers (AS) may not be reachable, and/or a DNS server may not always be able to resolve a DNS query with the performance of existing methods.

SUMMARY

In EC scenarios, different instances of Application Servers (AS) may be deployed in the different Edge Clouds and/or local networks and central networks for a certain application. An instance may be understood herein as a single realization of an application server that may be running. Therefore, a UE may be understood to need to properly resolve the IP address of the AS in the Edge Cloud in order to trigger a connection towards that AS. The DNS solutions proposed in 3GPP comprise deploying a local DNS server in each Edge Cloud, since each Edge Cloud may handle a different range of IP addresses and prefixes, and then providing the IP address of the DNS server to the UE in a PDU session establishment response. Then, the UE may use the local DNS server to resolve the addresses of the applications. However, this solution presents the following problems. One problem is that the network operator may only assign a single local DNS server in EC scenarios. This may be understood to mean that all DNS queries may need to be directed to that server, whether the DNS queries may be related to EC applications or not. The local DNS server may resolve the addresses of the applications deployed in the same Edge Cloud the DNS server may be deployed at. For the applications that may not be not deployed in the same Edge Cloud however, e.g. in other Edge Clouds or the central network or the internet, the local DNS server may be required to query other DNS servers which may respond with the IP address of an AS in an unforeseeable location. In case the local DNS server does not have access to other DNS servers, the local DNS server may not be able to resolve the DNS query. These issues may be understood be difficult to detect and solve by the operator, since the Edge Cloud may be managed by a third party.

Another problem may be that there is no existing mechanism to change dynamically the DNS server allocated to a UE. This may be problematic e.g., when the UE moves and attaches to different radio network nodes, e.g., gNBs. The Edge Cloud may not be valid any longer to fulfill the service requirements. However, as the local DNS server cannot be updated, the ASs in a different Edge Cloud cannot be reached. This may then result in not meeting the latency requirements for edge cloud applications, as the application server serving the user session is not changed when the UE moves.

Yet another problem may be that, there may be Edge Clouds without a local DNS server, or with several DNS servers. In this case, it may be more problematic if a single DNS server is allocated to the UE as per the current methods. Then, this may then result in a non-optimal DNS server allocation which may impact the user quality of experience for edge cloud applications.

It is an object of embodiments herein to improve the handling of usage of a DNS server in a communications network.

According to a first aspect of embodiments herein, the object is achieved by a method, performed by a first node. The method is for handling usage of a DNS server in a communications network. The first node operates in the communications network. The first node obtains one or more first indications. The one or more first indications indicate one or more rules on how a device operating in the communications network is to select, based on one or more criteria, a DNS server, out of one or more DNS servers, for use by the device for an application. The one or more first indications comprise an explicit indication of one of: a) which applications the one or more rules apply to, and b) that the one or more rules apply to all applications. The first node then sends a second indication to one of: another node operating in the communications network, and the device. The second indication indicates the obtained one or more first indications.

According to a second aspect of embodiments herein, the object is achieved by a method, performed by a second node.

The method is for handling usage of the DNS server in the communications network. The second node operates in the communications network. The second node receives, from the first node operating in the communications network, the second indication. The second indication indicates the one or more first indications indicating the one or more rules on how the device is to select, based on the one or more criteria, the DNS server, out of the one or more DNS servers for use by the device the for the application. The second indication comprises the explicit indication of one of: a) which applications the one or more rules apply to, and b) that the one or more rules apply to all applications. The second node selects the DNS server, out of the one or more DNS servers, for use by the device for the application. The selecting is based on the received second indication.

According to a third aspect of embodiments herein, the object is achieved by a method, performed by a second node. The method is for handling usage of a DNS server in the communications network. The second node operates in the communications network. The second node sends, to the first node operating in the communications network, the one or more first indications. The one or more first indications indicate the one or more rules on how the device operating in the communications network is to select, based on the one or more criteria, the DNS server, out of the one or more DNS servers, for use by the device for the application. The one or more first indications comprise the explicit indication of one of: a) which applications the one or more rules apply to, and b) that the one or more rules apply to all applications.

According to a fourth aspect of embodiments herein, the object is achieved by the first node, for handling usage of a DNS server in the communications network. The first node is configured to operate in the communications network. The first node is further configured to obtain the one or more first indications. The one or more first indications are configured to indicate the one or more rules on how the device configured to operate in the communications network is to select, based on the one or more criteria, the DNS server, out of the one or more DNS servers, for use by the device for the application. The one or more first indications are configured to comprise the n explicit indication of one of: a) which applications the one or more rules apply to, and b) that the one or more rules apply to all applications. The first node is also configured to send the second indication to one of: the another node configured to operate in the communications network and the device. The second indication is configured to indicate the one or more first indications configured to be obtained.

According to a fifth aspect of embodiments herein, the object is achieved by the device, for handling usage of a DNS server in the communications network. The device is configured to operate in the communications network. The device is further configured to receive, from the first node configured to operate in the communications network, the second indication. The second indication is configured to indicate the one or more first indications configured to indicate the one or more rules on how the device is to select, based on the one or more criteria, the DNS server, out of the one or more DNS servers, for use by the device for the application. The second indication is configured to comprise the explicit indication of one of: a) which applications the one or more rules apply to, and b) that the one or more rules apply to all applications. The device is further configured to select the DNS server, out of the one or more DNS servers, for use by the device for the application. The selecting is configured to be based on the second indication configured to be received.

According to a sixth aspect of embodiments herein, the object is achieved by the second node, for handling usage of a DNS server in the communications network. The second node is configured to operate in the communications network. The second node is further configured to send, to the first node configured to operate in the communications network, the one or more first indications. The one or more first indications are configured to indicate the one or more rules on how the device configured to operate in the communications network is to select, based on the one or more criteria, the DNS server, out of the one or more DNS servers, for use by the device for the application. The one or more first indications are configured to comprise the explicit indication of one of: a) which applications the one or more rules apply to, and b) that the one or more rules apply to all applications.

According to a seventh aspect of embodiments herein, the object is achieved by a computer program, comprising instructions which, when executed on at least one processor, cause the at least one processor to carry out the method performed by the first node.

According to an eighth aspect of embodiments herein, the object is achieved by a computer-readable storage medium, having stored thereon the computer program, comprising instructions which, when executed on at least one processor, cause the at least one processor to carry out the method performed by the first node.

According to a ninth aspect of embodiments herein, the object is achieved by a computer program, comprising instructions which, when executed on at least one processor, cause the at least one processor to carry out the method performed by the device.

According to a tenth aspect of embodiments herein, the object is achieved by a computer-readable storage medium, having stored thereon the computer program, comprising instructions which, when executed on at least one processor, cause the at least one processor to carry out the method performed by device.

According to an eleventh aspect of embodiments herein, the object is achieved by a computer program, comprising instructions which, when executed on at least one processor, cause the at least one processor to carry out the method performed by the second node.

According to a twelfth aspect of embodiments herein, the object is achieved by a computer-readable storage medium, having stored thereon the computer program, comprising instructions which, when executed on at least one processor, cause the at least one processor to carry out the method performed by the second node.

By obtaining the one or more first indications, the first node may be enabled to send the second indication. By sending the second indication indicating the obtained one or more first indications, the first node may be enabled to dynamically configure the device, by the device receiving the second indication, and then selecting the DNS server, to use a particular DNS server instance or instances, on a per application basis, and even more particularly, an EC application basis, and according to different criteria, such as location of the device, slice type, DNS server encryption support, DNS server filtering support, DNS server location: on the public Internet or on private or local networks etc. For example, the first node may enable the device to select DNS server 1, a local DNS server, for App 1 in location A, DNS server 2, another local DNS server, for App 1 in location B, DNS server 3, a central DNS server, for App 2 in any location. In other words, the first node may enable the device to select different DNS servers for different applications in the same location, and/or select different DNS servers for the same application in different locations.

By sending the second indication, the first node may be therefore enabled to change or update, the allocation of DNS servers in the device, by the device receiving the second indication, and then selecting the DNS server, as may be instructed by an operator of the communications network, at any moment.

Moreover, the first node may enable the application to receive the most suitable application server according to, for example, the area in which a subscriber, e.g., a user of the device, may be connected to.

By the second node sending the one or more first indications to the first node, the first node may then be enabled to obtain the one or more first indications, and then send the second indication. This may enable an operator of the communications network to manage an optimal allocation of different DNS servers based on different criteria, e.g. application, location of the device, slice type, DNS server encryption support, DNS server filtering support, DNS server location: on the public Internet or on private or local networks etc, this on a per application basis and specifically for Edge Computing scenarios. The operator of the communications network may therefore be enabled to change or update, the allocation of DNS servers for the device at any moment.

BRIEF DESCRIPTION OF THE DRAWINGS

Examples of embodiments herein are described in more detail with reference to the accompanying drawings, according to the following description.

DETAILED DESCRIPTION

Certain aspects of the present disclosure and their embodiments address one or more of the issues with the existing methods discussed in the background section and provide solutions to the challenges discussed.

Embodiments herein may be understood to relate in general to traffic management in 5G networks. Further particularly, embodiments herein may be understood to be related to a mechanism for allocation a DNS server or servers for EC applications using UE policies. Even further particularly, embodiments herein may be understood to relate to a mechanism which may be based on an extension of the UE policies, such as those that may be generated by a PCF and sent towards a UE through an AMF, which mechanism may allow a network operator to dynamically instruct a UE on a particular DNS server instance or instances to use, on a per (EC) application basis, and according to different criteria, such as location of the user, slice type, DNS server encryption support, DNS server filtering support, DNS server location: on the public Internet or on private or local networks etc.

The embodiments will now be described more fully hereinafter with reference to the accompanying drawings, in which examples are shown. In this section, embodiments herein are illustrated by exemplary embodiments. It should be noted that these embodiments are not mutually exclusive. Components from one embodiment or example may be tacitly assumed to be present in another embodiment or example and it will be obvious to a person skilled in the art how those components may be used in the other exemplary embodiments. All possible combinations are not described to simplify the description.

Figure 1:
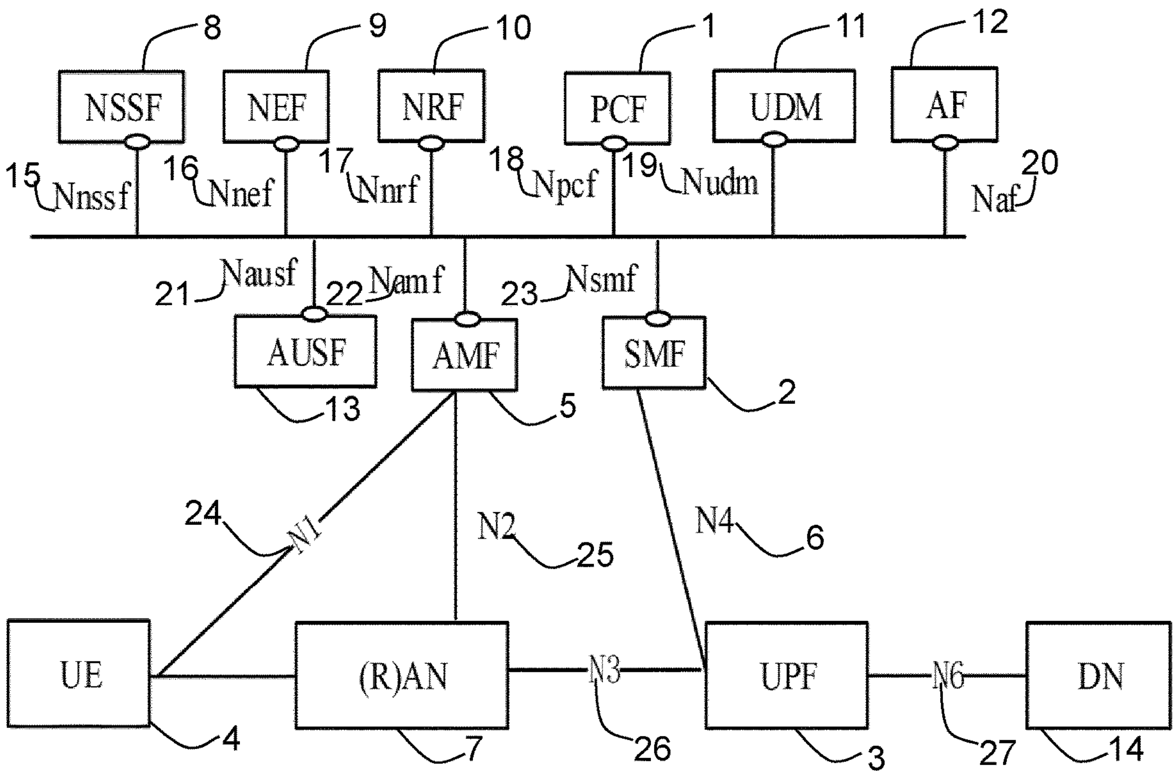
FIG. 1 is a schematic diagram illustrating a non-limiting example of a 5G Network Architecture.
Figure 2:
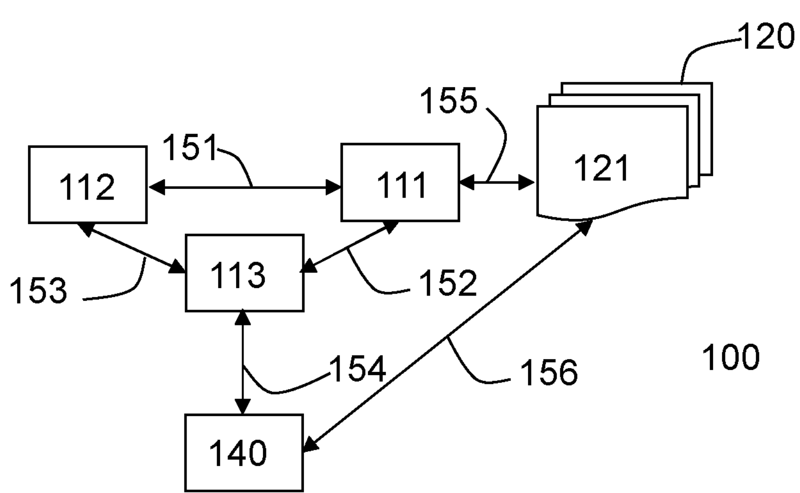
FIG. 2 is a schematic diagram illustrating a non-limiting example of a communications network, according to embodiments herein.
Figure 2:
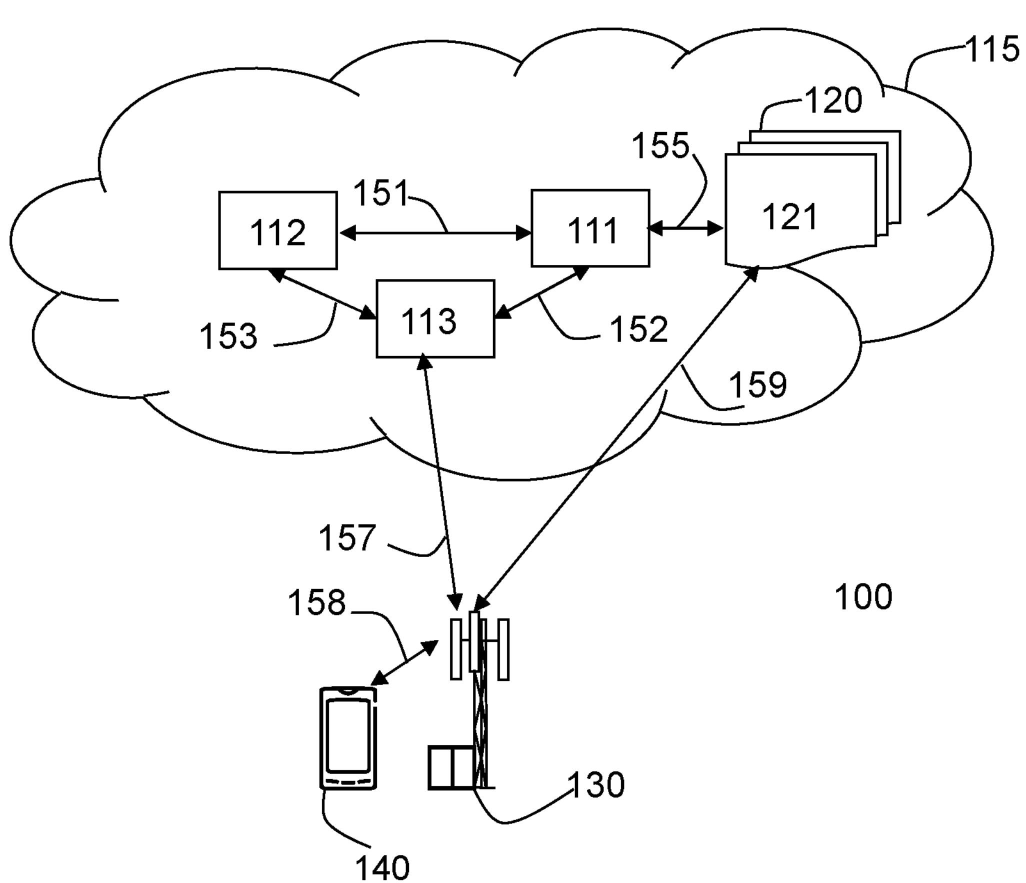

FIG. 2 depicts two non-limiting examples, in panels "a" and "b", respectively, of a communications network 100, in which embodiments herein may be implemented. In some example implementations, such as that depicted in the non-limiting example of FIG. 2*a*, the communications network 100 may be a computer network. In other example implementations, such as that depicted in the non-limiting example of FIG. 2*b*, the communications network 100 may be implemented in a telecommunications network, sometimes also referred to as a cellular radio system, cellular network or wireless communications system. In some examples, the telecommunications network may comprise network nodes which may serve receiving nodes, such as wireless devices, with serving beams.

In some examples, the telecommunications network may for example be a network such as 5G system, or a newer system supporting similar functionality. The telecommunications network may also support other technologies, such as a Long-Term Evolution (LTE) network, e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Wireless Local Area Network/s (WLAN) or WiFi network/s, Worldwide Interoperability for Microwave Access (WiMax), IEEE 802.15.4-based low-power short-range networks such as IPv6 over Low-Power Wireless Personal Area Networks (6LowPAN), Zigbee, Z-Wave, Bluetooth Low Energy (BLE), or any cellular network or system. The telecommunications network may for example support a Low Power Wide Area Network (LPWAN).

LPWAN technologies may comprise Long Range physical layer protocol (LoRa), Haystack, SigFox, LTE-M, and Narrow-Band IoT (NB-IoT).

Although terminology from Long Term Evolution (LTE)/5G has been used in this disclosure to exemplify the embodiments herein, this should not be seen as limiting the scope of the embodiments herein to only the aforementioned system. Other wireless systems support similar or equivalent functionality may also benefit from exploiting the ideas covered within this disclosure. In future telecommunication networks, e.g., in the sixth generation (6G), the terms used herein may need to be reinterpreted in view of possible terminology changes in future technologies.

The communications network 100 may comprise a plurality of nodes, whereof a first node 111, a second node 112, and another node 113, which may be understood to be a third node 113, are depicted in FIG. 2. Any of the first node 111, the second node 112 and the another node 113 may be understood, respectively, as a first computer system, a second computer system, and a third computer system. In some examples, any of the first node 111, the second node 112, and the another node 113 may be implemented as a standalone server in e.g., a host computer in the cloud 115. Any of the first node 111, the second node 112, and the another node 113 may in some examples be a distributed node or distributed server, with some of their respective functions being implemented locally, e.g., by a client manager, and some of its functions implemented in the cloud 115, by e.g., a server manager. Yet in other examples, any of the first node 111, the second node 112, and the another node 113 may also be implemented as processing resources in a server farm.

In some embodiments, any of the first node 111, the second node 112, and the another node 113 may be independent and separated nodes. In other embodiments, any of the first node 111, the second node 112 and the another node 113 may be co-located or be the same node. All the possible combinations are not depicted in FIG. 2 to simplify the Figure.

In some examples of embodiments herein, the first node 111 may be a node having a capability to manage or control policies, such as a PCF in 5G, or a node capable of performing a similar function in the communications network 100. The second node 112 may be a node or database having a capability to store information about subscriptions of users of the communications network 100, such as a Unified Data Repository (UDR) in 5G, or a node or database capable of performing a similar function in the communications network 100. The another node 113 may be a node having a capability to manage access and mobility functions in the communications network 100, such as an AMF in 5G, or a node capable of performing a similar function in the communications network 100.

The communications network 100 also comprises one or more DNS servers 120. The one or more DNS servers 120 comprise a DNS server 121, that is, a first DNS server 121. Any of the DNS servers 120 may be understood to be able to translate domain names into IP addresses, making it possible for DNS clients to reach an origin server.

The communications network 100 may comprise one or more radio network nodes, whereof a radio network node 130 is depicted in FIG. **2*b*. The radio network node 130 may typically be a base station or Transmission Point (TP), or any other network unit capable to serve a wireless device or a machine type node in the communications network 100. The radio network node 130 may be e.g., a 5G gNB, a 4G eNB, or a radio network node in an alternative 5G radio access technology, e.g., fixed or WiFi. The radio network node 130 may be e.g., a Wide Area Base Station, Medium Range Base Station, Local Area Base Station and Home Base Station, based on transmission power and thereby also coverage size. The radio network node 130 may be a stationary relay node or a mobile relay node. The radio network node 130 may support one or several communication technologies, and its name may depend on the technology and terminology used. The radio network node 130** may be directly connected to one or more networks and/or one or more core networks.

The communications network 100 covers a geographical area which may be divided into cell areas, wherein each cell area may be served by a radio network node, although, one radio network node may serve one or several cells.

The communications network 100 comprises a device 140. The device 140 may be also known as e.g., user equipment (UE), a wireless device, mobile terminal, wireless terminal and/or mobile station, mobile telephone, cellular telephone, or laptop with wireless capability, or a Customer Premises Equipment (CPE), just to mention some further examples. The device 140 in the present context may be, for example, portable, pocket-storable, hand-held, computer-comprised, or a vehicle-mounted mobile device, enabled to communicate voice and/or data, via a RAN, with another entity, such as a server, a laptop, a Personal Digital Assistant (PDA), or a tablet computer, sometimes referred to as a tablet with wireless capability, or simply tablet, a Machine-to-Machine (M2M) device, a device equipped with a wireless interface, such as a printer or a file storage device, modem, Laptop Embedded Equipped (LEE), Laptop Mounted Equipment (LME), USB dongles, CPE or any other radio network unit capable of communicating over a radio link in the communications network 100. The device 140 may be wireless, i.e., it may be enabled to communicate wirelessly in the communications network 100 and, in some particular examples, may be able support beamforming transmission. The communication may be performed e.g., between two devices, between a device and a radio network node, and/or between a device and a server. The communication may be performed e.g., via a RAN and possibly one or more core networks, comprised, respectively, within the communications network 100. In some particular embodiments, the device 140 may be an IoT device, e.g., a NB IoT device.

The first node 111 may communicate with the second node 112 over a first link 151, e.g., a radio link or a wired link. The first node 111 may communicate with the another node 113 over a second link 152, e.g., a radio link or a wired link. The another node 113 may communicate with the second node 112 over a third link 153, e.g., a radio link or a wired link. The another node 113 may communicate with the radio network node 130 over a fourth link 154, e.g., a radio link or a wired link. The DNS server 121 may communicate with the first node 111 over a fifth link 155, e.g., a radio link. Each of the DNS servers 120 may communicate with the first node 111 over a respective fifth link 155. The DNS server 121 may communicate with the device 140 over a sixth link 156, e.g., a wired link or a radio link. Each of the DNS servers 120 may communicate with the device 140 over a respective sixth link 156. The another node 113 may communicate with the radio network node 130 over a seventh link 157, e.g., a radio link or a wired link. The device 140 may communicate with the radio network node 130 over an eighth link 158, e.g., a radio link. The DNS server 121 may communicate with the radio network node 130 over a ninth link 159, e.g., a wired link or a radio link. The eighth link 158 may be a direct link or comprise one or more links, e.g., via one or more other nodes, network nodes or radio network nodes. Any of the first link 151, the second link 152, the third link 153, the fourth link 154, the fifth link 155, the sixth link 156, the seventh link 157, and the ninth link 159 may be a direct link or it may go via one or more computer systems or one or more core networks in the communications network 100, or it may go via an optional intermediate network. The intermediate network may be one of, or a combination of more than one of, a public, private or hosted network; the intermediate network, if any, may be a backbone network or the Internet, which is not shown in FIG. 2.

In general, the usage of "first", "second", "third", "fourth", "fifth", "sixth", "seventh", "eighth" and/or "ninth" herein may be understood to be an arbitrary way to denote different elements or entities, and may be understood to not confer a cumulative or chronological character to the nouns they modify.

Figure 3:
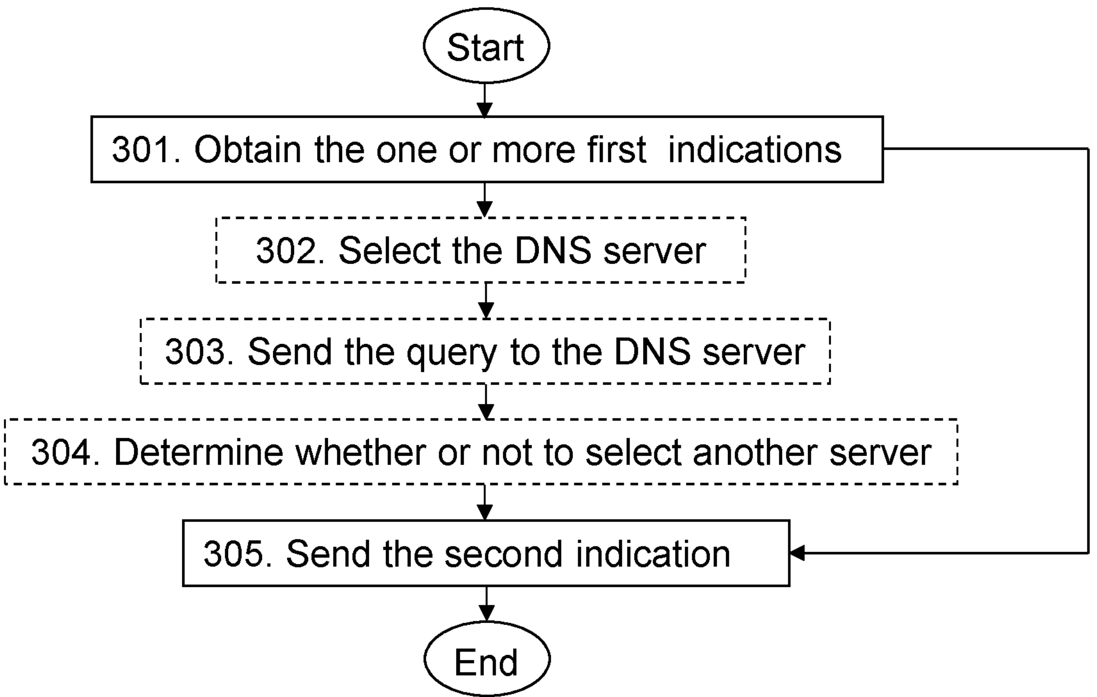
FIG. 3 is a flowchart depicting embodiments of a method in a first node, according to embodiments herein.

Embodiments of a method, performed by the first node 111, will now be described with reference to the flowchart depicted in FIG. 3. The method may be understood to be or handling usage of a Domain Name Service (DNS) server 120 in a communications network 100. The first node 111 operates in the communications network 100.

The method may comprise the actions described below. In some embodiments all the actions may be performed. In some embodiments some of the actions may be performed. In FIG. 3, optional actions are indicated with a dashed box. One or more embodiments may be combined, where applicable. All possible combinations are not described to simplify the description. It should be noted that the examples herein are not mutually exclusive. Components from one example or embodiment may be tacitly assumed to be present in another example or embodiment and it will be obvious to a person skilled in the art how those components may be used in the other examples or embodiments.

Action 301

During the course of operations of the communications network 100, the device 140 may initiate usage an application, such as e.g., example.com. By doing that, the device 140 may contact the another node 113, and trigger the establishment of a data session, e.g., a Protocol Data Unit, PDU, session. To be able to use the application in the communications network 100, the device 140 may need to use a DNS server to translate domain names, e.g., example.com, into IP addresses, making it possible for a DNS client to reach an origin server, e.g., an application server instance. Since the communications network 100 comprises the one or more servers 120, at least one of the one or more DNS servers 120 may need to be selected for the device 140 to use for the application. How the device 140 may need to select the DNS server to use may be determined based on one or more rules that may apply to the device 140. The DNS server may be understood to be for use by the device 140 to resolve one or more, or any, DNS query or queries from the application.

As part of the establishment of the data session, the another node 113, e.g., an AMF, may therefor need to find out what rules may apply to the device 140 to manage its data session in the communications network 100, including how to select the DNS server. The another node 113 may then contact the first node 111, either directly or indirectly, to obtain the information on which rules may apply to the first node 111. The first node 111 may then also try to find out which rules may apply to the device 140.

In order to find out which rules may apply to the device 140 for the data session for the application, e.g., example.com, in this Action 301, the first node 111 obtains one or more first indications. The one or more first indications indicate one or more rules on how the device 140 operating in the communications network 100 is to select, based on one or more criteria, a DNS server, such as the DNS server 121, out of one or more DNS servers 120, for use by the device 140 for an application. The one or more first indications comprise an explicit indication of one of: a) which applications the one or more rules apply to, and b) that the one or more rules apply to all applications.

In some embodiments, obtaining, may comprise retrieving from a memory, e.g., of the first node 111. In some embodiments, obtaining may comprise receiving. In such embodiments, the one or more first indications may be obtained from the second node 112 operating in the communications network 100, e.g., via the first link 151.

The one or more first indications may be understood to indicate a policy, e.g., a UE DNS Policy (UDNSP). The one or more rules may be those that may need to be enforced in the device 140.

In some embodiments, the first node 111 may be a PCF and the second node 112 may be a UDR. In some examples of such embodiments, the first node 111 may obtain the one or more first indications in a UDR Policy Profile Response, in reply to a UDR Policy Profile Request the first node 111 may have sent to the second node 112, e.g., triggered by the establishment of the data session with the device 140. The one or more first indications in some examples, such as this one, may be a subscriber policy profile.

The explicit indication may be understood as an indication of the type of traffic the policy may apply to. In some examples, the type of traffic the policy may apply to may be indicated in the one or more first indications with a list of identifiers of the applications it may apply to. As an example, the policy may apply only to traffic for a certain edge computing application, e.g. example.com. Otherwise, the policy may apply to may be indicated in the one or more first indications with an "Any" notation. This may be understood to indicate that this policy may need to always be applied. It may be used as the default UDNSP when no other UDNSPs with higher precedence may have been applied.

The one or more criteria may comprise one or more of the following options. According to a first option, the one or more criteria may comprise the application for which the device 140 is to instantiate the DNS server 121. That is, for example, the choice of DNS server may be performed on an application basis, some rules may apply to one application, and other rules may apply to another application. According to a second option, the one or more criteria may comprise whether or not the application is for edge computing (EC). According to a third option, the one or more criteria may comprise a first location, that is, a location, of the device 140. That is, for example, the choice of DNS server may be performed based on the location of the device 140. According to a fourth option, the one or more criteria may comprise a second location, that is, a location, of the DNS server 121. That is, for example, the choice of DNS server may be performed based on the location of the DNS server 121. According to a fifth option, the one or more criteria may comprise a type of slice instantiated for the use of the DNS server 121 by the device 140. According to a sixth option, the one or more criteria may comprise, a Radio Access Technology to be used by the device 140 to run the application.

According to the foregoing, the one or more first indications may be understood to be, in some examples, a subscriber policy profile, which may be understood to be extended with an indication that a certain application, identified by its app-ID or Fully Qualified Domain Name (FQDN), may be an Edge Computing application and the DNS information to be applied for the EC application.

The location of the device 140 may be understood to be relevant, since in Edge Computing scenarios, the device 140 may be required to leverage the edge applications hosted in the nearest Edge Cloud. In this case, the device 140 may be enabled to connect to the DNS server 121 resolving the IP addresses of the closest Edge Cloud.

The slice type may be relevant since there may be specific DNS servers on a per slice type. For example, for a mission critical slice, a DNS server may be used to resolve the IP addresses of the mission critical applications towards the closest Edge Cloud.

The one or more first indications may be understood to comprise a DNS description. Particularly, the one or more first indications may indicate one or more of the following. First, an address of the DNS server 121. The address of the DNS server 121 may be a DNS Server IP address, which may be understood to identify the DNS Server instance. Second, whether or not the DNS server 121 supports encryption. The one or more first indications may indicate if the DNS Server 121 instance supports encryption or not, and which type of encryption it may be e.g., DoH, DoT, etc. . . . . Third, whether or not the DNS server 121 supports filtering. Filtering may be understood as, e.g., a capability to block malicious websites and filter out harmful or inappropriate content. Fourth, a type of filtering supported by the DNS server 121. The type of filtering may be for example, security to e.g., block malicious websites, or parental control, to block traffic certain websites. Fifth, the second location of the DNS server 121. The second location of the DNS server 121, or DNS server location may be understood to indicate if the DNS Server 121 may be located on the public Internet or on private or local networks.

By obtaining the one or more first indications in this Action 301, the first node 111 may be enabled to select a DNS server for the device 140 in the next Action 302. This may in turn enable an operator of the communications network 111 to manage an optimal allocation of different DNS servers based on different criteria, e.g. application, location of the device 140, slice type, DNS server encryption support, DNS server filtering support, DNS server location: on the public Internet or on private or local networks etc, this on a per application basis and specifically for Edge Computing scenarios. The operator of the communications network 100 may therefore be enabled to change or update, the allocation of DNS servers for the device 140 at any moment.

Action 302

Optionally, in this Action 302, the first node 111 may select the DNS server 121, out of the one or more DNS servers 120, for use by the device 140 for the application. The selecting in this Action 302 may be based on the obtained one or more first indications, that is, based on the one or more rules and the fulfilment or not of the one or more criteria.

The first node 111 may have obtained information pertaining to the fulfilment of one or more criteria for the device 140, such as e.g., the application for which the device 140 is the first location of the device 140, the second location of the DNS server 121, the type of slice instantiated for the use of the DNS server 121 by the device 140, the RAT used by the device 140 to run the application, etc. The first node 111 may have obtained this information by subscribing to one or more nodes, to be able to receive this information. For example, in embodiments wherein the first node 111 may be a PCF, the first node 111 may have received this information in responses to a subscription to the another node 113, e.g., an AMF. Then, in this Action 302, the first node 111 may apply the information obtained with regards to the device 140, to the criteria and the one or more rules indicated by the one or more first indications and select the DNS server 121 accordingly.

There may be a mapping between DNS Servers and locations, on a per application basis, e.g., on a per edge computing application basis. This mapping may be stored in a the another node 113, for example, a database, e.g., UDR, so that the first node 111 may be able to retrieve this data and select the DNS server 121, or any other DNS server from the one or more DNS servers 120, e.g., DNS Server instance/s. Additionally, as an alternative, the first node 111 may dynamically obtain this mapping between DNS Servers and locations through a new Nnef northbound Application Program Interface (API) from the content provider for the application, e.g., an online gaming company which may deploy their own application servers and DNS servers on multiple locations.

In some examples, the first node 111 may subscribe to location, and location change, events. In order to do that, the first node 111 may subscribes to another node 113 events for the UE related to location, and location change. The subscription may be performed by the first node 111 triggering towards the another node 113 a Namf_Event Exposure Subscribe Request message, which may include the following parameters EventID=Location and Input=UEID. In some examples, the first node 111 may perform this Action 302 after receiving a notification, e.g., from the another node 113, that the device 140 has changed location.

By selecting the DNS server 121 in this Action 302, the first node 111 may dynamically choose a particular DNS server instance or instances for the device 140 to use, on a per application basis, and even more particularly, an EC application basis, and according to different criteria, such as location of the device 140, slice type, DNS server encryption support, DNS server filtering support, DNS server location: on the public Internet or on private or local networks etc. For example, the first node 111 may select DNS server 1, a local DNS server, for App 1 in location A, DNS server 2, another local DNS server, for App 1 in location B, DNS server 3, a central DNS server, for App 2 in any location. In other words, the first node 111 may select different DNS servers for different applications in the same location, and/or select different DNS servers for the same application in different locations.

By selecting the DNS server 121 in this Action 302, the first node 111 may therefore be enabled to change or update, the allocation of DNS servers in the device 140, as may be instructed by the operator of the communications network 100, at any moment.

Moreover, the first node 111 may enable the application to receive the most suitable application server according to the area in which a subscriber, e.g., a user of the device 140, may be connected to.

Furthermore, by selecting the DNS server 121 in this Action 302, the first node 111 may enable that security issues related to DNS cache poisoning may be improved, since such queries may be handled based on information provided via UDNSP instead of DNS cache. In other words, the first node 111 may choose a DNS server for which security checks have already been pre-arranged for the particular application being used, and thereby avoid choosing a non-safe DNS server for this particular application, due to a rigid rule, e.g., based solely on location of the device 140, and disregarding the particular security requirements that the application for which the DNS server is going to be used for may have.

Action 303

Prior to indicating the selected DNS server 121 to the device 140, the first node 111 may decide to first run a check to verify that the DNS server 121 may be able to resolve the address of the application. With this purpose, in this Action 303, the first node 111 may send a query to the selected DNS server 121 based on an address of the application.

The query may be, e.g., a DNS query.

In this Action 304, the sending may be implemented, e.g., via the fifth link 155.

By sending the query in this Action 303, the first node 111 may then be enabled to determine, in the next Action 304, if the selected DNS server 121 may be eligible.

Action 304

In this Action 304, the first node 111 may determine whether or not to select another DNS server, based on whether or not a response to the query is received from the selected DNS server 121.

Determining may be understood as e.g., calculating, deciding. The first node 111 may check if, in response to Action 303, it receives a response with the application's IP address(es) from the DNS server 121. If the query is successful, and the first node 111 receives a response, the first node 111 may then perform Action 305.

In case the query is not successful, and the first node 111 fails to receive a response from the DNS server 121, the first node 111 may perform Action 302 again, select another DNS server, and performs the verification again of Action 303 and Action 304.

By the first node 111 determining whether or not to select another DNS server, based on whether or not a response to the query is received from the selected DNS server 121, the first node 111 may then be enabled to include the DNS server 121 in another indication in the Action 305.

Action 305

In this Action 305, the first node 111, sends a second indication to one of: the another node 113 operating in the communications network 100 and the device 140. The second indication indicates the obtained one or more first indications.

The second indication may for example, indicate a new UE DNS Policy (UDNSP). For example, the second indication may be: "{UE policy for DNS(appID=example.com, List of DNS Server instances(DNS Server IP, DNS Server encryption, DNS Server filtering, DNS Server location}".

The second indication may be, for example, comprised in a Npcf_AMPolicyControl_Create Response message, which may be sent from a PCF to an AMF, as will be illustrated later with a non-limiting example.

In some embodiments wherein Action 302 may have been performed, the second indication may indicate the selected DNS server 121.

The second indication may further indicate one or more of: a) an order of enforcement of the policy, and b) a type of traffic the policy applies to. The order of enforcement of the policy may be, for example a rule precedence, which may determine the order the policy, e.g., a UE DNS Policy (UDNSP) rule may need to be enforced in the device 140.

The type of traffic the policy applies to may be understood as a traffic descriptor, which may determine the traffic to which the UDNSP rule may apply to, as follows. In some examples, the type of traffic the policy may apply to may be indicated in the second indication with a list of identifiers of the applications it may apply to, e.g., a list of appId. As an example, the policy may apply only to traffic for a certain edge computing application, e.g. example.com. Otherwise, the type of traffic the policy may apply to may be indicated in the second indication with an "Any" notation. This may be understood to indicate that this policy may need to always be applied. It may be used as the default UDNSP when no other UDNSPs with higher precedence may have been applied.

As described earlier, the one or more first indications may be understood to comprise a DNS descriptor determining the DNS policies. The one or more first indications may indicate the DNS Server instance, that may have been selected by the operator of the communications network 100 based on different criteria, e.g., the current first location of the device 140, the slice type, etc . . . , in order of precedence, where each instance may include the following information: the address of the DNS server 121, whether or not the DNS server 121 supports encryption, e.g., and which type of encryption, e.g., DoH, DoT, whether or not the DNS server 121 supports filtering, e.g., and which type of filtering, and the second location of the DNS server 121.

In this Action 303, the sending may be implemented, e.g., via the second link 152 when sending to the another node 113, and via the second link 152 and the fourth link 154, or the via the second link 152, the seventh link 157 and the eighth link 158 when sending to the device 140.

The second indication may be, or may be comprise in, a Npcf_AMPolicyControl_Create Response message.

In case there are several DNS servers suitable for the application, the first node 111 may send different second indications, e.g., indicating different UDNSP policies for each DNS server, including a different precedence, or the first node 111 may include several DNS servers in the same UDNSP with the same precedence, so the device 140 may be enabled to select one of them randomly.

In any of the foregoing embodiments, the first node 111 may be a PCF, the another node 113 may be an AMF, and the second node 112 may be a UDR or a further node operating in the communications network 100. The device 140 may be a UE.

By sending the second indication in this Action 305, the first node 111 may be enabled to dynamically configure the device 140 to use a particular DNS server instance or instances, on a per application basis, and even more particularly, an EC application basis, and according to different criteria, such as location of the device 140, slice type, DNS server encryption support, DNS server filtering support, DNS server location: on the public Internet or on private or local networks etc. For example, the first node 111 may enable the device 140 to select DNS server 1, a local DNS server, for App 1 in location A, DNS server 2, another local DNS server, for App 1 in location B, DNS server 3, a central DNS server, for App 2 in any location. In other words, the first node 111 may enable the device 140 to select different DNS servers for different applications in the same location, and/or select different DNS servers for the same application in different locations.

By sending the second indication in this Action 302, the first node 111 may be therefore enabled to change or update, the allocation of DNS servers in the device 140, as may be instructed by the operator of the communications network 100, at any moment.

Moreover, the first node 111 may enable the application to receive the most suitable application server according to the area in which a subscriber, e.g., a user of the device 140, may be connected to.

Furthermore, by sending the second indication in this Action 302, the first node 111 may enable that security issues related to DNS cache poisoning may be improved, since such queries may be handled based on information provided via UDNSP instead of DNS cache. In other words, the first node 111 may choose a DNS server for which security checks have already been pre-arranged for the particular application being used, and thereby avoid choosing a non-safe DNS server for this particular application, due to a rigid rule, e.g., based solely on location of the device 140, and disregarding the particular security requirements that the application for which the DNS server is going to be used for may have.

As stated earlier, in some embodiments, the one or more first indications may indicate the address of the DNS server 121. Therefore, an additional advantage provided by sending the second indication in this Action 305 may be that a time to solve DNS queries may be understood to be reduced due to the fact that host names addresses, e.g., as described earlier under the heading Domain Names Hierarchy, may be provisioned, so it may not be needed to check from top to down in the DNS hierarchy.

Figure 4:
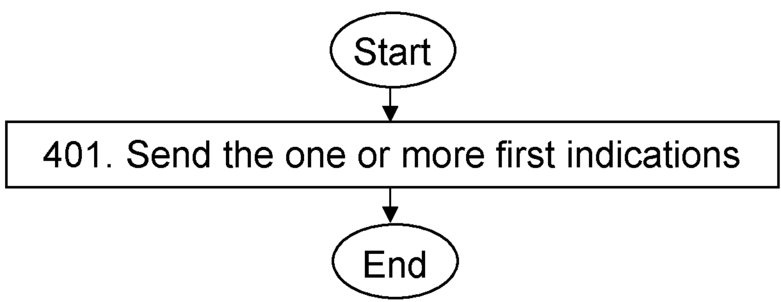
FIG. 4 is a flowchart depicting embodiments of a method in a device, according to embodiments herein.

Embodiments of a method performed by the second node 112 will now be described with reference to the flowchart depicted in FIG. 4. The method may be understood to be for handling usage of a DNS server, such as the DNS server 121, in the communications network 100. The second node 112 operates in the communications network 100.

The method comprises the following actions. One or more embodiments may be combined, where applicable. All possible combinations are not described to simplify the description. It should be noted that the examples herein are not mutually exclusive. Components from one example or embodiment may be tacitly assumed to be present in another example or embodiment, and it will be obvious to a person skilled in the art how those components may be used in the other examples.

The detailed description of some of the following corresponds to the same references provided above, in relation to the actions described for the first node 111 and will thus not be repeated here to simplify the description. For example, the first node 111 may be a PCF, the another node 113 may be an AMF, and the second node 112 may be a UDR or a further node operating in the communications network 100. The device 140 may be a UE.

Action 401

In this Action 401, the second node 112 may send, to the first node 111 operating in the communications network 100, the one or more first indications. The one or more first indications indicate the one or more rules on how the device 140 operating in the communications network 100 is to select, based on the one or more criteria, the DNS server 121, out of the one or more DNS servers 120, for use by the device 140 for the application. The one or more first indications comprise the explicit indication of one of: a) which applications the one or more rules apply to, and b) that the one or more rules apply to all applications.

The sending in this Action 401, may be understood as transmitting, providing or sharing, in and may be implemented, for example, via the first link 151.

By sending the one or more first indications in this Action 401, the second node 112 may enable the first node 111 to then select the DNS server 121 for the device 140 for use for the application, as described in next Action 302. This may in turn enable the operator of the communications network 111 to manage an optimal allocation of different DNS servers based on different criteria, e.g. application, location of the device 140, slice type, DNS server encryption support, DNS server filtering support, DNS server location: on the public Internet or on private or local networks etc, this on a per application basis and specifically for Edge Computing scenarios. The operator of the communications network 100 may therefore be enabled to change or update, the allocation of DNS servers for the device 140 at any moment.

Figure 5:
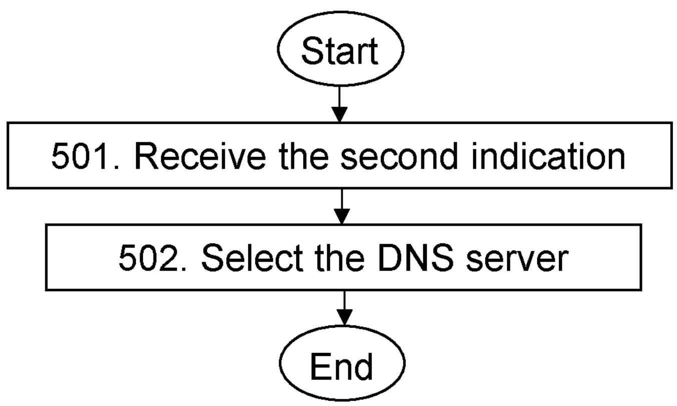
FIG. 5 is a flowchart depicting embodiments of a method in a second node, according to embodiments herein.

Embodiments of a method performed by the device 140, will now be described with reference to the flowchart depicted in FIG. 5. The method may be understood to be for handling usage of a DNS server, such as the DNS server 121, in the communications network 100. The device 140 operates in the communications network 100.

The method comprises the following actions. Several embodiments are comprised herein. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples.

The detailed description of some of the following corresponds to the same references provided above, in relation to the actions described for the first node 111 and will thus not be repeated here to simplify the description. For example, the first node 111 may be a PCF, the another node 113 may be an AMF, and the second node 112 may be a UDR or a further node operating in the communications network 100. The device 140 may be a UE.

Action 501

In this Action 501, the device 140 receives, from the first node 111 operating in the communications network 100, the second indication. The second indication indicates the one or more first indications indicating the one or more rules on how the device 140 is to select, based on the one or more criteria, the DNS server 121, out of the one or more DNS servers 120, for use by the device 140 for the application. The second indication comprises the explicit indication of the one of: a) which applications the one or more rules apply to, and b) that the one or more rules apply to all applications.

The receiving may be understood to be directly from the first node 111, or via another node, such as the another node 113, which may transparently forward the second indication to the device 140. The receiving in this Action 501, may be performed, for example, via the second link 152, and the fourth link 154, or via the second link 152, the seventh link 157 and the eight link 158.

The one or more first indications may be understood to indicate a policy, e.g., a UE DNS Policy (UDNSP). For example, the second indication may be: "{UE policy for DNS(appID=example.com, List of DNS Server instances (DNS Server IP, DNS Server encryption, DNS Server filtering, DNS Server location}".

If received indirectly, e.g., via the another node 113, the second indication may be comprised in, or received as, a third indication. For example, the third indication may be a PDU Session Establishment Response.

In some embodiments wherein Action 302 may have been performed, the second indication may indicate the selected DNS server 121 by the first node 111.

The second indication may further indicate one or more of: a) the order of enforcement of the policy, and b) the type of traffic the policy may apply to.

By receiving the second indication in this Action 501, the device 140 may be enabled to select the DNS server 121 to use for the application in the next Action 502. The specific benefits of this Action 501 may be understood to correspond to those already described for Action 305.

Action 502

After receiving the second indication, the device 140 may store it.

In this Action 502, the device 140 selects the DNS server 121, out of the one or more DNS servers 120, for use by the device 140 for the application. The selecting 502 is based on the received second indication. This Action 502 may be understood to be performed similarly to how it was described in Action 302, but with the information collected by the device 140.

The selected DNS server 121 may then be understood to be used by the device 140 to resolve one or more, or any, DNS query or queries from the application.

The device 140 may select the DNS server 121 autonomously, or if the DNS server 121 has already been selected by the first node 111, implement the selection performed by the first node 111.

The device 140 may start an edge computing application, such as example.com. When the device 140 may detect that the application, e.g., example.com, tries to send application traffic which matches the Traffic Descriptor described earlier, e.g., appId=example.com, in the one or more first indications, e.g., in the UDNSP policy, the device 140 may select the DNS server instance in the DNS Descriptor in order to resolve all DNS queries from that application, and e.g., with higher precedence than the default DNS server for the PDU session of the device 140. If the device 140 received several UDNSP policies for the appID, the device 140 may select one of the DNS server instances according to the UDNSP policies received for that appID, and their precedence.

The device 140 may perform the selecting in this Action 502 for each application. Therefore, the device 140 may select different DNS servers for different applications in the same location, and/or select different DNS servers for the same application in different locations.

Based on the received second indication, e.g., a UDNSP policy, the device 140 may then be enabled to perform the following. When the device 140 may detect a certain UE application, e.g. example.com, the device 140 may try to send application traffic which matches the Traffic Descriptor, e.g. appId=example.com, in the second indication, that is, the UDNSP policy. The device 140 may select one of the DNS server instances provided in the second indication, e.g., in the DNS Descriptor, in order to resolve all DNS queries from that application, and with higher precedence than the default DNS server for the PDU session of the device 140.

By selecting the DNS server 121 in this Action 502, the device 140 may be enabled to dynamically use a particular DNS server instance or instances, on a per application basis, and even more particularly, an EC application basis, and according to different criteria, such as location of the device 140, slice type, DNS server encryption support, DNS server filtering support, DNS server location: on the public Internet or on private or local networks etc. For example, the device 140 may be enabled to select DNS server 1, a local DNS server, for App 1 in location A, DNS server 2, another local DNS server, for App 1 in location B, DNS server 3, a central DNS server, for App 2 in any location. In other words, the device 140 may be enabled to select different DNS servers for different applications in the same location, and/or select different DNS servers for the same application in different locations.

The device 140 may be therefore be enabled to change or update, the allocation of DNS servers, as may be managed by the operator of the communications network 100, at any moment.

Moreover, the device 140 may enable the application to receive the most suitable application server according to the area in which a subscriber, e.g., a user of the device 140, may be connected to.

Furthermore, as stated earlier, security issues related to DNS cache poisoning may be improved, since such queries may be handled based on information provided via UDNSP instead of DNS cache. As stated earlier, in some embodiments, the one or more first indications may indicate the address of the DNS server 121. Therefore, an additional advantage may be that the time to solve DNS queries may be understood to be reduced due to the fact that host names addresses, e.g., as described earlier under the heading Domain Names Hierarchy, may be provisioned, so it may not be needed to check from top to down in the DNS hierarchy.

The methods just described as being implemented by the first node 111, the second node 112 and the device 140 will now be described in further detail with a specific non-limiting example in the next figure.

Figure 6:
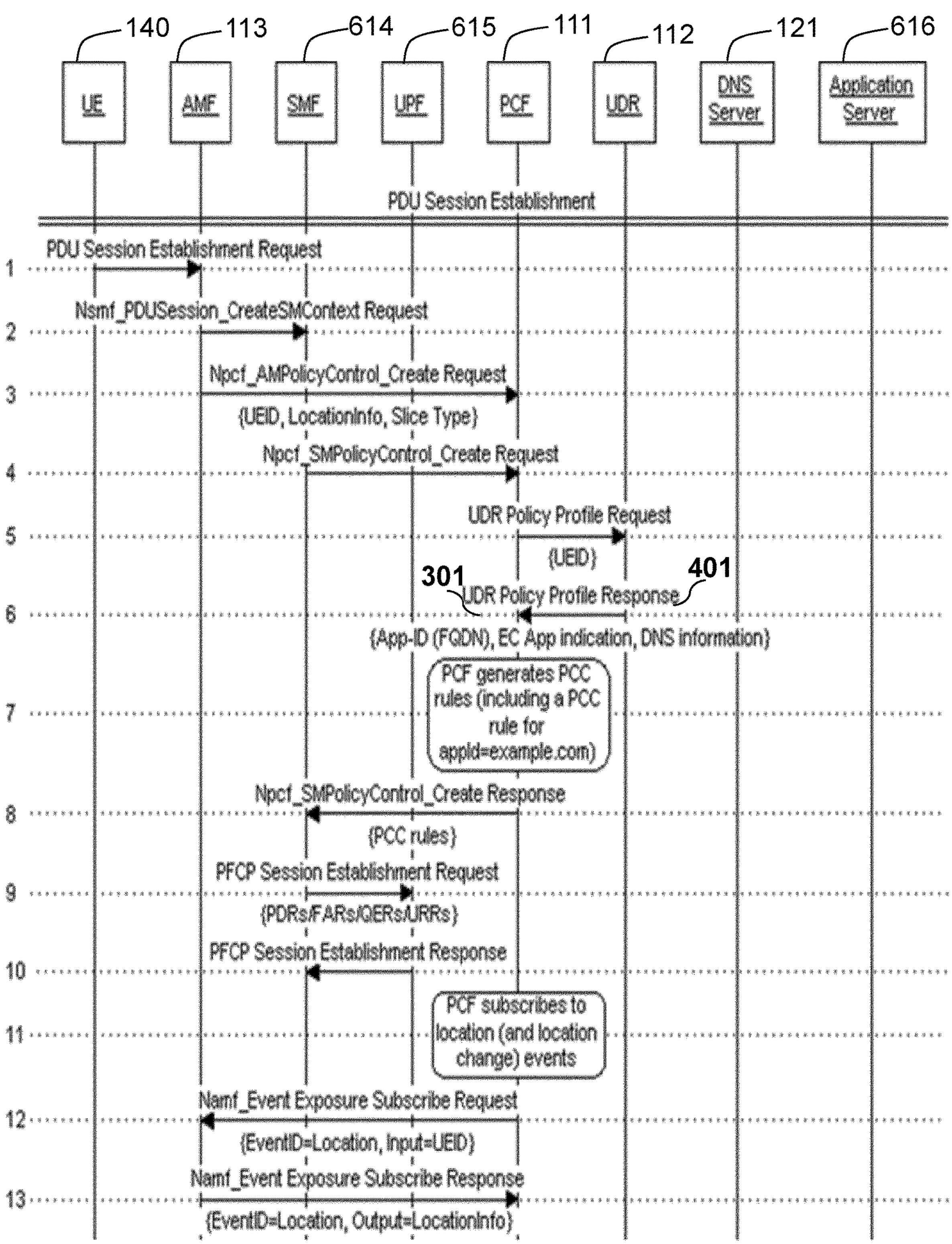
FIG. 6 is a schematic diagram depicting a non-limiting example of signalling between nodes in a communications network, according to embodiments herein.
Figure 7:
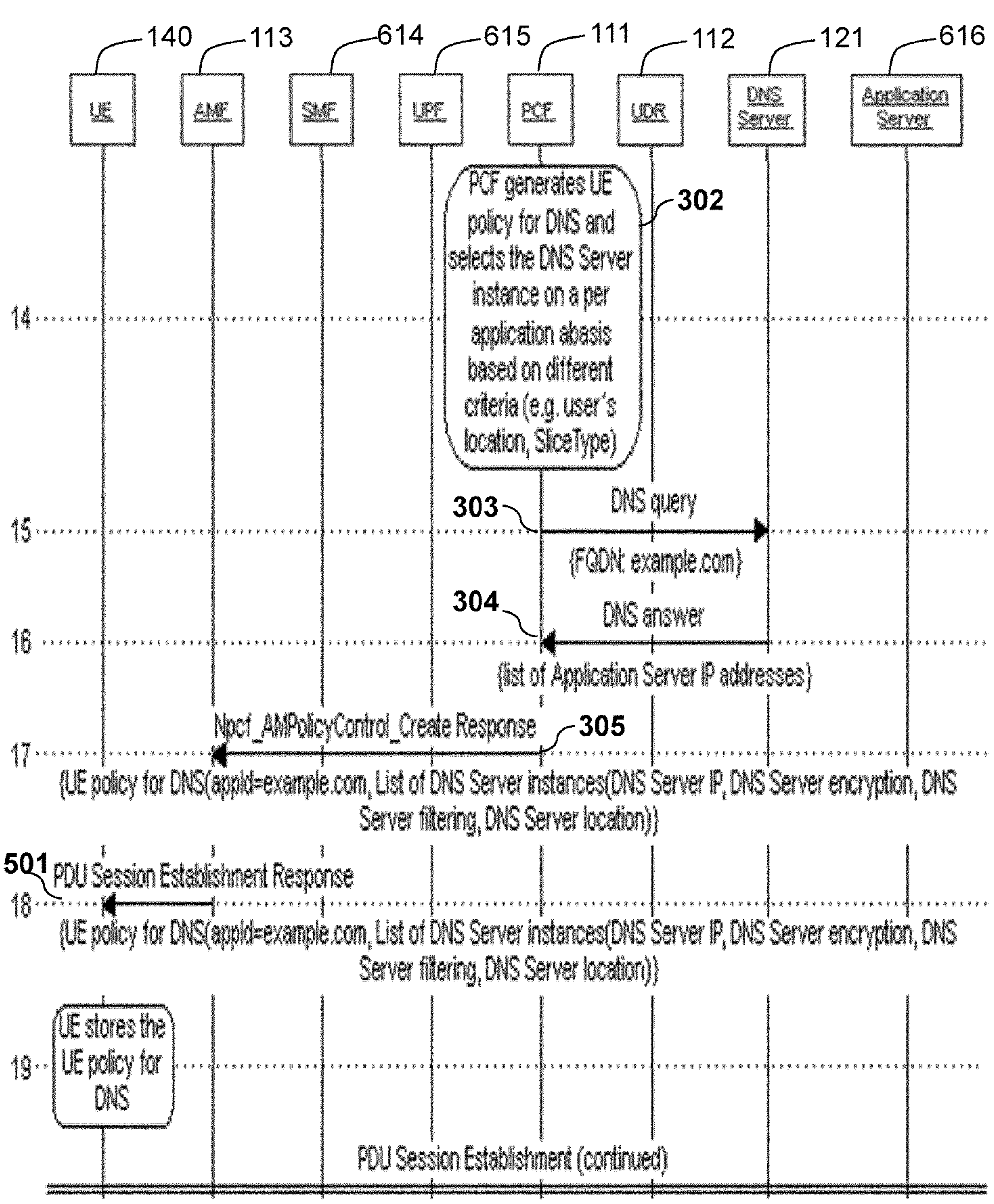
FIG. 7 is a schematic diagram depicting a continuation of FIG. 6.
Figure 8:
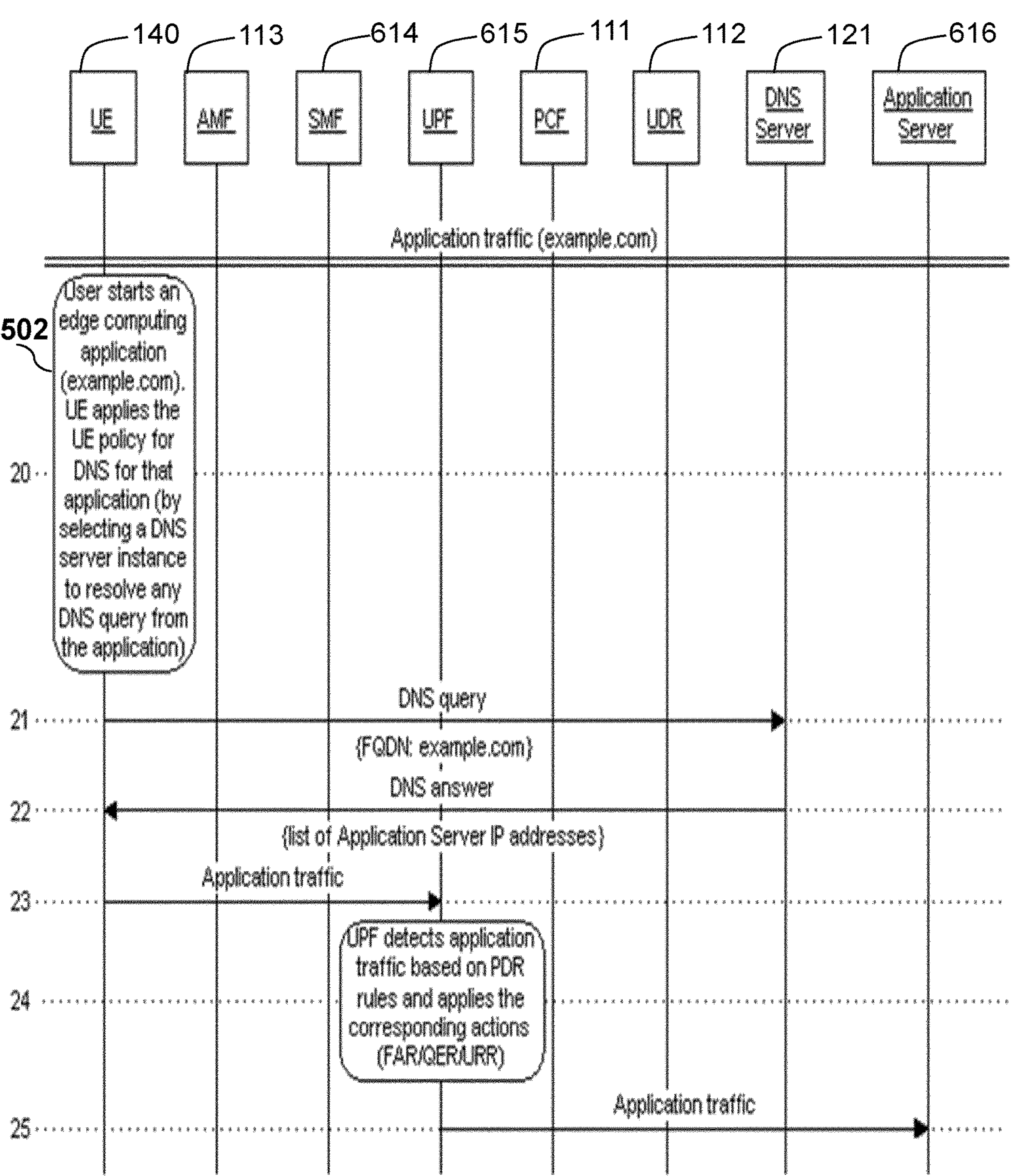
FIG. 8 is a schematic diagram depicting a continuation of FIG. 7.

FIG. 6 is a signalling diagram depicting a non-limiting example of embodiments herein. In this non-limiting example, the first node 111 is a PCF, the second node 112 is a UDR, the another node 113 is an AMF, and the device 140 is a UE. According to this example, the one or more first indications are based on an extension of the UE policies generated by the PCF and sent towards UE through the AMF, which may allow the network operator to dynamically instruct the UE on the DNS server instance/s to use on a per application basis and according to different criteria, e.g., user's location, slice type, DNS server encryption support, DNS server filtering support, DNS server location: on the public Internet or on private or local networks etc. The sequence diagram shown in FIG. 6, as well as its continuation on FIG. 7 and FIG. 8, shows an example for optimal DNS server instance allocation for an edge computing application, here, example.com, based on current user's location and RAT Type. In steps 1-4, the device 140 triggers a PDU Session Establishment procedure by sending a PDU Session Establishment Request to the another node 113. The another node 113 sends a Nsmf_PDUSession_CreateSMContext Request to a fourth node 614, here an SMF, at Step 2. As part of the PDU Session Establishment procedure, the another node 113 creates the policy association with the PCF in Step 3, by sending an Npcf_SMPolicyControl_Create Request including the identifier of the device 140, the UEID, the UE location, as LocationInfo, and slice type information. The fourth node 614 creates the policy association with the PCF at Step 4 by sending a Npcf_SMPolicyControl_Create Request. At steps 5, the first node 111 sends a UDR Policy Profile Request to the second node 112, indicating the identifier of the device 140. At step 6, in accordance with Action 301, the first node 111 retrieves from the second node 112 the one or more first indications as a subscriber policy profile, which is extended, according to embodiments herein, with an indication that a certain Application, identified by its app-ID or FQDN, is an Edge Computing application (EC App indication) and the DNS information to be applied for the EC application. As described earlier, the DNS information may comprise: the DNS Server IP address, the DNS server encryption, the DNS server filtering, and the DNS server location. At steps 7, the first node 111 generates PCC rules, including a PCC rule for appId=example.com. At step 8, the first node 111 sends a Npcf_SMPolicyControl-_Create Response to the fourth node 614 to e.g., detect traffic and to apply corresponding traffic management actions. At step 9, the fourth node 614 triggers a PFCP Session Establishment procedure towards a fifth node 615, here a UPF, to indicate the PDRs and the corresponding enforcement actions, e.g., FARs, QERs, URRs, etc, for the PDU session. The fourth node 614 may include an UL/DL PDR with PDI type appId, e.g., example.com, which may be associated to the corresponding enforcement actions, e.g., FAR, QER, URR. At step 10, the fifth node 615 sends a PFCP Session Establishment response to the fourth node 614. At step 11, the first node 111 subscribes to location, and location change, events. In order to do that, the first node 111 subscribes with the another node 113 to events related to Location and Location change for the UE, by the first node 111 triggering towards the another node 113 an Namf_Event Exposure Subscribe Request message including the following parameters: EventID=Location, and Input=UEID. At step 13, the another node 113 answers the first node 111*by* triggering a Namf EventExposure Subscribe Response message including the following parameters:EventID=Location, and Output=LocationInfo, which indicates the current location of the device 140, e.g., a cell identifier (Cell ID). Although it is not shown in the sequence diagram of FIG. 6, when the location of the device 140 changes, e.g. from CellID #1 to CellID #2, the another node 113 may notify the first node 111 on the new location of the device 140. Also depicted in FIG. 6 are the DNS server 121, and an application server 616.

FIG. 7 is a continuation of the procedure depicted in FIG. 6. At step 14, in accordance with Action 302, the first node 111 generates a UE policy for DNS and selects the DNS Server 121 instance for the application, example.com, based on different criteria, e.g. user's location, RAT Type. To verify that the DNS server 121 can resolve the application's address, at step 15, in accordance with Action 303, the first node 111 sends a DNS query to the selected DNS server 121 and checks if it receives, at step 16, in accordance with Action 304, a response with the application's IP address(es). In case the DNS query is not successful, the first node 111 selects another DNS server, and performs the verification of steps 15 and 16 again. At step 17, in accordance with Action 305, the first node 111 forwards the UE policy to the another node 113, by sending the second indication in the Npcf_AM-PolicyControl_Create Response message, as follows. The second indication is a UE DNS Policy (UDNSP), which includes, in this example, a Rule precedence, a Traffic Descriptor, and a DNS Descriptor. The rule precedence determines the order the UDNSP rule is enforced in the device 140. The Traffic Descriptor determines the traffic to which the UDNSP rule applies to, as follows: List of appId: in this example, traffic for a certain edge computing application, e.g. example.com, and "Any", which indicates that this policy is always applied. It may be used as the default UDNSP when no other UDNSPs with higher precedence have been applied. The DNS Descriptor determines the DNS policies, as follows. DNS Server 121 instance, selected by the operator of the communications network 100, based on different criteria, such as, e.g., current location of the device 140, slice type, in order of precedence, where each instance includes the following information: the DNS Server 121 IP address, which may identify the DNS Server 121 instance, DNS server encryption, which may indicate if the DNS Server 121 instance supports encryption or not, and which type of encryption, e.g. DoH, DoT, DNS server filtering, which may indicate if the DNS Server 121 instance supports filtering or not, and which type of filtering, and DNS server location, which may indicate if the DNS Server 121 is located on the public Internet or on private or local networks. At step 18, the another node 113 transparently forwards to the device 140 the above UE Policy for DNS in a PDU Session Establishment Response, which is received by the device 140 in accordance with Action 501. At step 19, the device 140 stores the UE policy for DNS. The PDU Session is therefore established.

FIG. 8 is a continuation of the procedure depicted in FIG. 7. Application traffic is received back and forth from the Application Server 616. At step 20 the device 140 starts an edge computing application, e.g., example.com. When the device 140 detects the UE application, example.com, tries to send application traffic which matches the Traffic Descriptor, e.g. appId=example.com, in the UDNSP policy, the device 140 may, in accordance with Action 502, select the DNS server 121 instance in the DNS Descriptor in order to resolve all DNS queries from that application, and with higher precedence than the default DNS server for the user's PDU session. If the device 140 received several UDNSP policies for the appID, the device 140 may select one of the DNS server instances according to the UDNSP policies received for that appID and their precedence. The device 140 may perform step 20 for each application. Therefore, the device 140 may be enabled to: select different DNS servers for different applications in the same location, and/or select different DNS servers for the same application in different locations. At step 21, the device 140 triggers a DNS query to the selected DNS Server 121 instance in the UE Policy for DNS, in order to resolve the application's FQDN domain, e.g., example.com. At step 22, the DNS server 121 replies to the device 140 with a DNS answer including the list of Application Server IP addresses. At step 23, the device 140 selects one Application Server IP address from the list and sends the application traffic to it. At steps 24, the fifth node 615 detects application traffic based on PDR rules and applies the corresponding actions, e.g., FAR/QER/URR, specifically the FAR instructs to forward the application traffic towards the Application Server 616, which the fifth node 615 does at step 25.

As a simplified example overview of the foregoing, embodiments herein may be understood to relate to a mechanism which may enable to solve the earlier described problems of the existing methods, and which may be understood to be based on the definition of a new type of UE policy: a UE DNS Policy (UDNSP), which may allow the operator of the communications network 100 to dynamically instruct the device 140 on the DNS server instance/s to use on a per application basis and according to different criteria, e.g. user's location, slice type, DNS server encryption support, DNS server filtering support, DNS server location: on the public Internet or on private or local networks etc.

Whenever a DNS policy may need to be triggered, e.g., after the device 140 may trigger a PDU session establishment or when the location of the device 140 may change, the first node 111 may triggers a new UE policy: UE DNS Policy (UDNSP) which may then be forwarded to the device 140, e.g., through the another node 113.

One advantage of embodiments herein is that they allow the operator of the communications network 100 for optimal allocation of different DNS servers based on different criteria, e.g., application, user's location, slice type, DNS server encryption support, DNS server filtering support, DNS server location: on the public Internet or on private or local networks etc, this on a per application basis and specifically for Edge Computing scenarios. As explained earlier, using the proposed solution the device 140 may be configured to use: DNS server 1, a first local DNS server, for App 1 in location A, DNS server 2, a second local DNS server, for App 1 in location B, DNS server 3, a central DNS server for App 2 in any location. In other words, the device 140 may be able to select different DNS servers for different applications in the same location, and/or select different DNS servers for the same application in different locations. Another advantage of embodiments herein may be that, the allocation of DNS servers in the device 140 may be changed or updated by the operator at any moment. Yet another advantage of embodiments herein may be that, the security issues related to DNS cache poisoning may be improved due to the fact that those queries may be handled based on information provided via UDNSP instead of DNS cache. A further advantage of embodiments herein may be that, the time to solve DNS queries may be reduced due to the fact that host names addresses may be provisioned so it may not be needed to check from top to down in the DNS hierarchy. Yet a further advantage of embodiments herein may be that, an application may receive the most suitable application server according to the area in which subscriber is connected. The first node 111 may determine the service area of a certain Edge Cloud by means of the mapping of the location of the device 140 to the corresponding DNS server resolving the IP addresses for the Edge Cloud.

Figure 9:
FIG. 9 is a schematic block diagram illustrating two non-limiting examples, a) and b), of a first node, according to embodiments herein.
Figure 9:
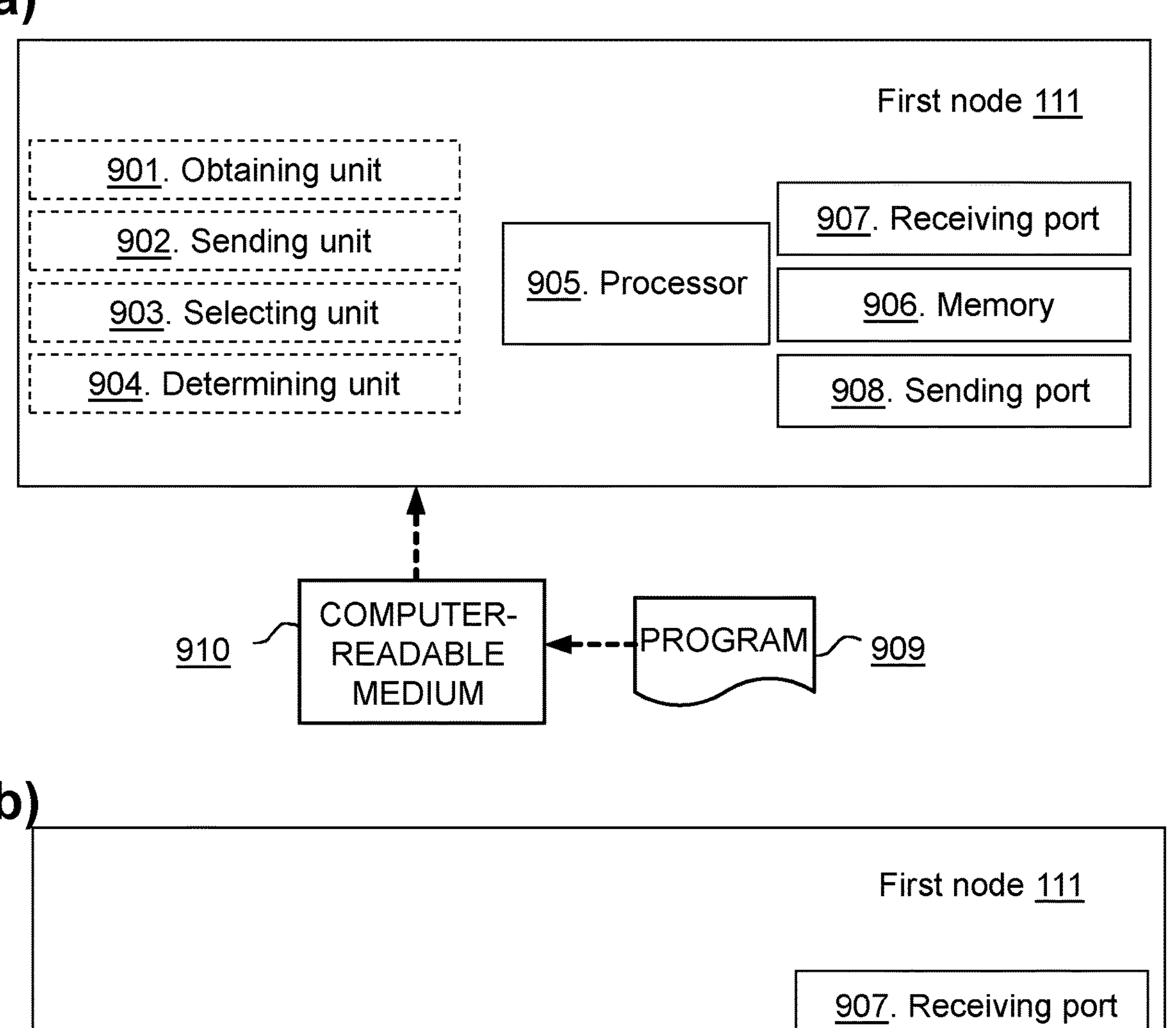
Figure 9:
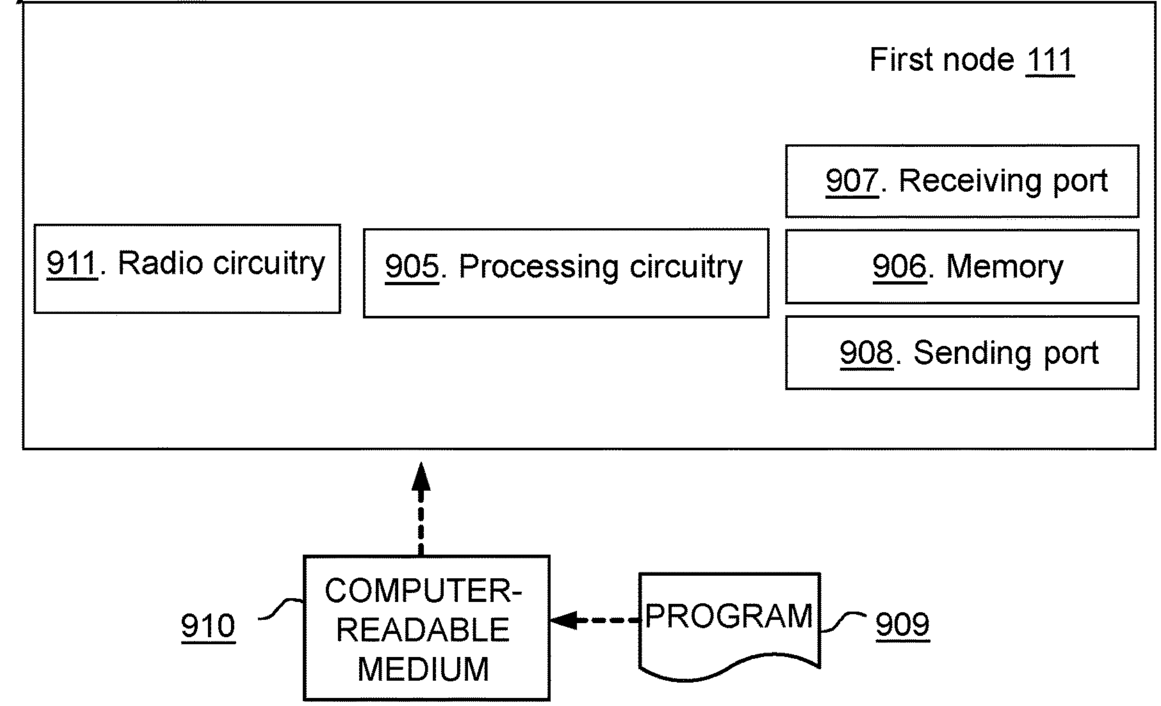

FIG. 9 depicts two different examples in panels a) and b), respectively, of the arrangement that the first node 111 may comprise to perform the method actions described above in relation to FIG. 3, FIG. 6, FIG. 7 or FIG. 8. In some embodiments, the first node 111 may comprise the following arrangement depicted in FIG. 9*a*. The first node 111 may be understood to be for handling usage of the DNS server 121 in the communications network 100. The first node 111 is configured to operate in the communications network 100.

Several embodiments are comprised herein. Components from one embodiment may be tacitly assumed to be present in another embodiment and it will be obvious to a person skilled in the art how those components may be used in the other exemplary embodiments. In FIG. 9, optional boxes are indicated by dashed lines. The detailed description of some of the following corresponds to the same references provided above, in relation to the actions described for the first node 111 and will thus not be repeated here. For example, the first node 111 the first node 111 may be configured to be a PCF, the another node 113 may be configured to be an AMF, and the second node 112 may be configured to be a UDR or a further node configured to operate in the communications network 100. The device 140 may be configured to be a UE.

The first node 111 is configured to, e.g. by means of an obtaining unit 901 within the first node 111 configured to, obtain the one or more first indications. The one or more first indications are configured to indicate the one or more rules on how the device 140 configured to operate in the communications network 100 is to select, based on the one or more criteria, the DNS server 121, out of the one or more DNS servers 120, for use by the device 140 for the application. The one or more first indications are configured to comprise the explicit indication of one of: a) which applications the one or more rules apply to, and b) that the one or more rules apply to all applications.

The first node 111 is also configured to, e.g. by means of a sending unit 902 within the first node 111 configured to, send the second indication to one of: the another node 113 configured to operate in the communications network 100 and the device 140. The second indication is configured to indicate the one or more first indications configured to be obtained.

The one or more criteria may be configured to comprise one or more of: a) the application for which the device 140 is to instantiate the DNS server 121, b) whether or not the application is for edge computing, c) the first location of the device 140, d) the second location of the DNS server 121, e) the type of slice configured to be instantiated for the use of the DNS server 121 by the device 140, and f) the RAT configured to be to be used by the device 140 to run the application.

The one or more first indications may be configured to indicate one or more of: a) the address of the DNS server 121, b) whether or not the DNS server 121 may support encryption, c) whether or not the DNS server 121 supports filtering, d) the type of filtering configured to be supported by the DNS server 121, and e) the second location of the DNS server 121.

The one or more first indications may be configured to indicate a policy.

The second indication may be further configured to indicate one or more of: a) the order of enforcement of the policy, and b) the type of traffic the policy may apply to.

In some embodiments, the first node 111 may be configured to, e.g. by means of a selecting unit 903 within the first node 111 configured to, select the DNS server 121, out of the one or more DNS servers 120, for use by the device 140 for the application. The selecting may be configured to be based on the one or more first indications configured to be indicated. The second indication may be configured to indicate the selected DNS server 121.

The first node 111 may be further configured to, e.g. by means of the sending unit 902 further configured to, send the query to the DNS server 121 configured to be selected based on the address of the application.

In some embodiments, the first node 111 may be configured to, e.g. by means of a determining unit 904 within the first node 111 configured to, determine whether or not to select another DNS server, based on whether or not the response to the query is received from the DNS server 121 configured to be selected.

In some embodiments, the one or more first indications may be configured to be obtained from the second node 112 configured to operate in the communications network 100.

The embodiments herein may be implemented through one or more processors, such as a processor 905 in the first node 111 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the in the first node 111. One such carrier may be in the form of a CD ROM disc. It is however feasible with other data carriers such as a memory stick. The computer program code may furthermore be provided as pure program code on a server and downloaded to the first node 111.

The first node 111 may further comprise a memory 906 comprising one or more memory units. The memory 906 is arranged to be used to store obtained information, store data, configurations, schedulings, and applications etc. to perform the methods herein when being executed in the first node 111.

In some embodiments, the first node 111 may receive information from, e.g., the second node 112, the another node 113, the fourth node 614, the fifth node 615, the sixth node 616, the DNS server 121, any of the one or more DNS servers 120, and/or the device 140 through a receiving port 907. In some examples, the receiving port 907 may be, for example, connected to one or more antennas in the first node 111. In other embodiments, the first node 111 may receive information from another structure in the communications network 100 through the receiving port 907. Since the receiving port 907 may be in communication with the processor 905, the receiving port 907 may then send the received information to the processor 905. The receiving port 907 may also be configured to receive other information.

The processor 905 in the first node 111 may be further configured to transmit or send information to e.g., the second node 112, the another node 113, the fourth node 614, the fifth node 615, the sixth node 616, the DNS server 121, any of the one or more DNS servers 120, the device 140 and/or another structure in the communications network 100, through a sending port 908, which may be in communication with the processor 905, and the memory 906.

Those skilled in the art will also appreciate that any of the units 901-904 described above may refer to a combination of analog and digital circuits, and/or one or more processors configured with software and/or firmware, e.g., stored in memory, that, when executed by the one or more processors such as the processor 905, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Any of the units 901-904 described above may be the processor 905 of the first node 111, or an application running on such processor.

Thus, the methods according to the embodiments described herein for the first node 111 may be respectively implemented by means of a computer program 909 product, comprising instructions, i.e., software code portions, which, when executed on at least one processor 905, cause the at least one processor 905 to carry out the actions described herein, as performed by the first node 111. The computer program 909 product may be stored on a computer-readable storage medium 910. The computer-readable storage medium 910, having stored thereon the computer program 909, may comprise instructions which, when executed on at least one processor 905, cause the at least one processor 905 to carry out the actions described herein, as performed by the first node 111. In some embodiments, the computer-readable storage medium 910 may be a non-transitory computer-readable storage medium, such as a CD ROM disc, a memory stick, or stored in the cloud space. In other embodiments, the computer program 909 product may be stored on a carrier containing the computer program, wherein the carrier is one of an electronic signal, optical signal, radio signal, or the computer-readable storage medium 910, as described above.

The first node 111 may comprise an interface unit to facilitate communications between the first node 111 and other nodes or devices, e.g., the second node 112, the another node 113, the fourth node 614, the fifth node 615, the sixth node 616, the DNS server 121, any of the one or more DNS servers 120, the device 140 and/or another structure in the communications network 100. In some particular examples, the interface may, for example, include a transceiver configured to transmit and receive radio signals over an air interface in accordance with a suitable standard.

In other embodiments, the first node 111 may comprise the following arrangement depicted in FIG. 9*b*. The first node 111 may comprise a processing circuitry 905, e.g., one or more processors such as the processor 905, in the first node 111 and the memory 906. The first node 111 may also comprise a radio circuitry 911, which may comprise e.g., the receiving port 907 and the sending port 908. The processing circuitry 905 may be configured to, or operable to, perform the method actions according to FIG. 3, FIG. 6, FIG. 7 and/or FIG. 8, in a similar manner as that described in relation to FIG. 9*a*. The radio circuitry 911 may be configured to set up and maintain at least a wireless connection with the second node 112, the another node 113, the fourth node 614, the fifth node 615, the sixth node 616, the DNS server 121, any of the one or more DNS servers 120, the device 140 and/or another structure in the communications network 100.

Hence, embodiments herein also relate to the first node 111 operative to handle usage of a DNS server 121 in the communications network 100, the first node 111 being operative to operate in the communications network 100. The first node 111 may comprise the processing circuitry 905 and the memory 906, said memory 906 containing instructions executable by said processing circuitry 905, whereby the first node 111 is further operative to perform the actions described herein in relation to the first node 111, e.g., in FIG. 3, FIG. 6, FIG. 7 and/or FIG. 8.

Figure 10:
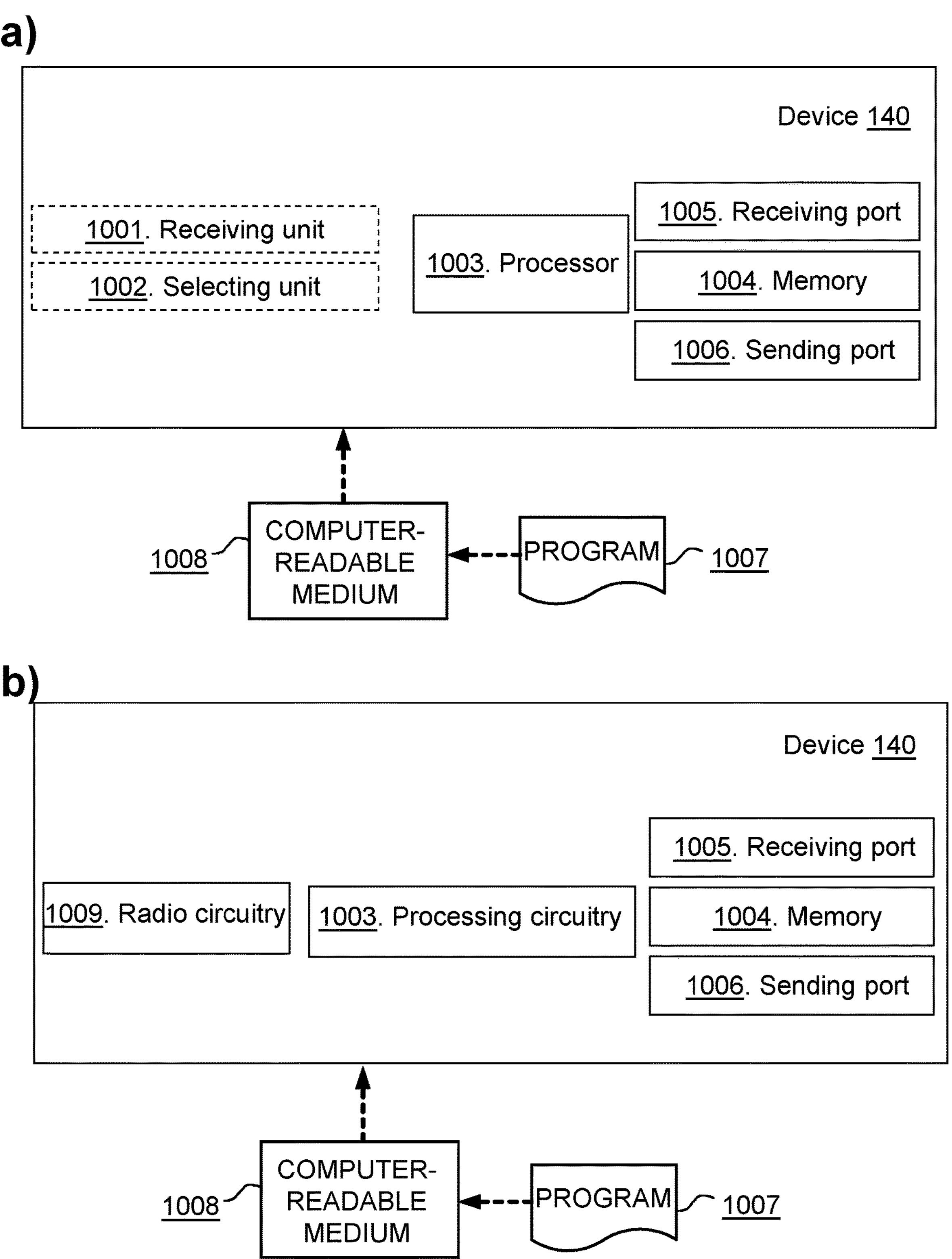
FIG. 10 is a schematic block diagram illustrating two non-limiting examples, a) and b), of a device, according to embodiments herein.

FIG. 10 depicts two different examples in panels a) and b), respectively, of the arrangement that the device 140 may comprise to perform the method actions described above in relation to FIG. 5, FIG. 6, FIG. 7 and/or FIG. 8. In some embodiments, the device 140 may comprise the following arrangement depicted in FIG. 10*a*. The device 140 may be understood to be for handling usage of a DNS server 121 in the communications network 100. The device 140 is configured to operate in the communications network 100.

Several embodiments are comprised herein. Components from one embodiment may be tacitly assumed to be present in another embodiment and it will be obvious to a person skilled in the art how those components may be used in the other exemplary embodiments. In FIG. 10, optional boxes are indicated by dashed lines. The detailed description of some of the following corresponds to the same references provided above, in relation to the actions described for the first node 111 and will thus not be repeated here. For example, the first node 111 the first node 111 may be configured to be a PCF, the another node 113 may be configured to be an AMF, and the second node 112 may be configured to be a UDR or a further node configured to operate in the communications network 100. The device 140 may be configured to be a UE.

The device 140 is configured to, e.g. by means of a receiving unit 1001 within the device 140 configured to, receive, from the first node 111 configured to operate in the communications network 100, the second indication. The second indication is configured to indicate the one or more first indications configured to indicate the one or more rules on how the device 140 is to select, based on the one or more criteria, the DNS server 121, out of the one or more DNS servers 120, for use by the device 140 for the application. The second indication is configured to comprise the explicit indication of one of: a) which applications the one or more rules apply to, and b) that the one or more rules apply to all applications.

The device 140 is also configured to, e.g. by means of a selecting unit 1002 within the device 140 configured to, select the DNS server 121, out of the one or more DNS servers 120, for use by the device 140 for the application. The selecting is configured to be based on the second indication configured to be received.

The embodiments herein may be implemented through one or more processors, such as a processor 1003 in the device 140 depicted in FIG. 10, together with computer program code for performing the functions and actions of the embodiments herein. The program code mentioned above may also be provided as a computer program product, for instance in the form of a data carrier carrying computer program code for performing the embodiments herein when being loaded into the in the device 140. One such carrier may be in the form of a CD ROM disc. It is however feasible with other data carriers such as a memory stick. The computer program code may furthermore be provided as pure program code on a server and downloaded to the device 140.

The device 140 may further comprise a memory 1004 comprising one or more memory units. The memory 1004 is arranged to be used to store obtained information, store data, configurations, schedulings, and applications etc. to perform the methods herein when being executed in the device 140.

In some embodiments, the device 140 may receive information from, e.g., the first node 111, the second node 112, the another node 113, the fourth node 614, the fifth node 615, the sixth node 616, the DNS server 121, and/or any of the one or more DNS servers 120, through a receiving port 1005. In some examples, the receiving port 1005 may be, for example, connected to one or more antennas in the device 140. In other embodiments, the device 140 may receive information from another structure in the communications network 100 through the receiving port 1005. Since the receiving port 1005 may be in communication with the processor 1003, the receiving port 1005 may then send the received information to the processor 1003. The receiving port 1005 may also be configured to receive other information.

The processor 1003 in the device 140 may be further configured to transmit or send information to e.g., the first node 111, the second node 112, the another node 113, the fourth node 614, the fifth node 615, the sixth node 616, the DNS server 121, any of the one or more DNS servers 120 and/or another structure in the communications network 100, through a sending port 1006, which may be in communication with the processor 1003, and the memory 1004.

Those skilled in the art will also appreciate that any of the units 1001-1002 described above may refer to a combination of analog and digital circuits, and/or one or more processors configured with software and/or firmware, e.g., stored in memory, that, when executed by the one or more processors such as the processor 1003, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Any of the units 1001-1002 described above may be the processor 1003 of the device 140, or an application running on such processor.

Thus, the methods according to the embodiments described herein for the device 140 may be respectively implemented by means of a computer program 1007 product, comprising instructions, i.e., software code portions, which, when executed on at least one processor 1003, cause the at least one processor 1003 to carry out the actions described herein, as performed by the device 140. The computer program 1007 product may be stored on a computer-readable storage medium 1008. The computer-readable storage medium 1008, having stored thereon the computer program 1007, may comprise instructions which, when executed on at least one processor 1003, cause the at least one processor 1003 to carry out the actions described herein, as performed by the device 140. In some embodiments, the computer-readable storage medium 1008 may be a non-transitory computer-readable storage medium, such as a CD ROM disc, a memory stick, or stored in the cloud space. In other embodiments, the computer program 1007 product may be stored on a carrier containing the computer program, wherein the carrier is one of an electronic signal, optical signal, radio signal, or the computer-readable storage medium 1008, as described above.

The device 140 may comprise an interface unit to facilitate communications between the device 140 and other nodes or devices, e.g., the first node 111, the second node 112, the another node 113, the fourth node 614, the fifth node 615, the sixth node 616, the DNS server 121, any of the one or more DNS servers 120 and/or another structure in the communications network 100. In some particular examples, the interface may, for example, include a transceiver configured to transmit and receive radio signals over an air interface in accordance with a suitable standard.

In other embodiments, the device 140 may comprise the following arrangement depicted in FIG. 10*b*. The device 140 may comprise a processing circuitry 1003, e.g., one or more processors such as the processor 1003, in the device 140 and the memory 1004. The device 140 may also comprise a radio circuitry 1009, which may comprise e.g., the receiving port 1005 and the sending port 1006. The processing circuitry 1003 may be configured to, or operable to, perform the method actions according to FIG. 5, FIG. 6, FIG. 7 and/or FIG. 8, in a similar manner as that described in relation to FIG. 10*a*. The radio circuitry 1009 may be configured to set up and maintain at least a wireless connection with the first node 111, the second node 112, the another node 113, the fourth node 614, the fifth node 615, the sixth node 616, the DNS server 121, any of the one or more DNS servers 120 and/or another structure in the communications network 100.

Hence, embodiments herein also relate to the device 140 operative to handle usage of a DNS server 121 in the communications network 100, the device 140 being operative to operate in the communications network 100. The device 140 may comprise the processing circuitry 1003 and the memory 1004, said memory 1004 containing instructions executable by said processing circuitry 1003, whereby the device 140 is further operative to perform the actions described herein in relation to the device 140, e.g., in FIG. 5, FIG. 6, FIG. 7 and/or FIG. 8.

Figure 11:
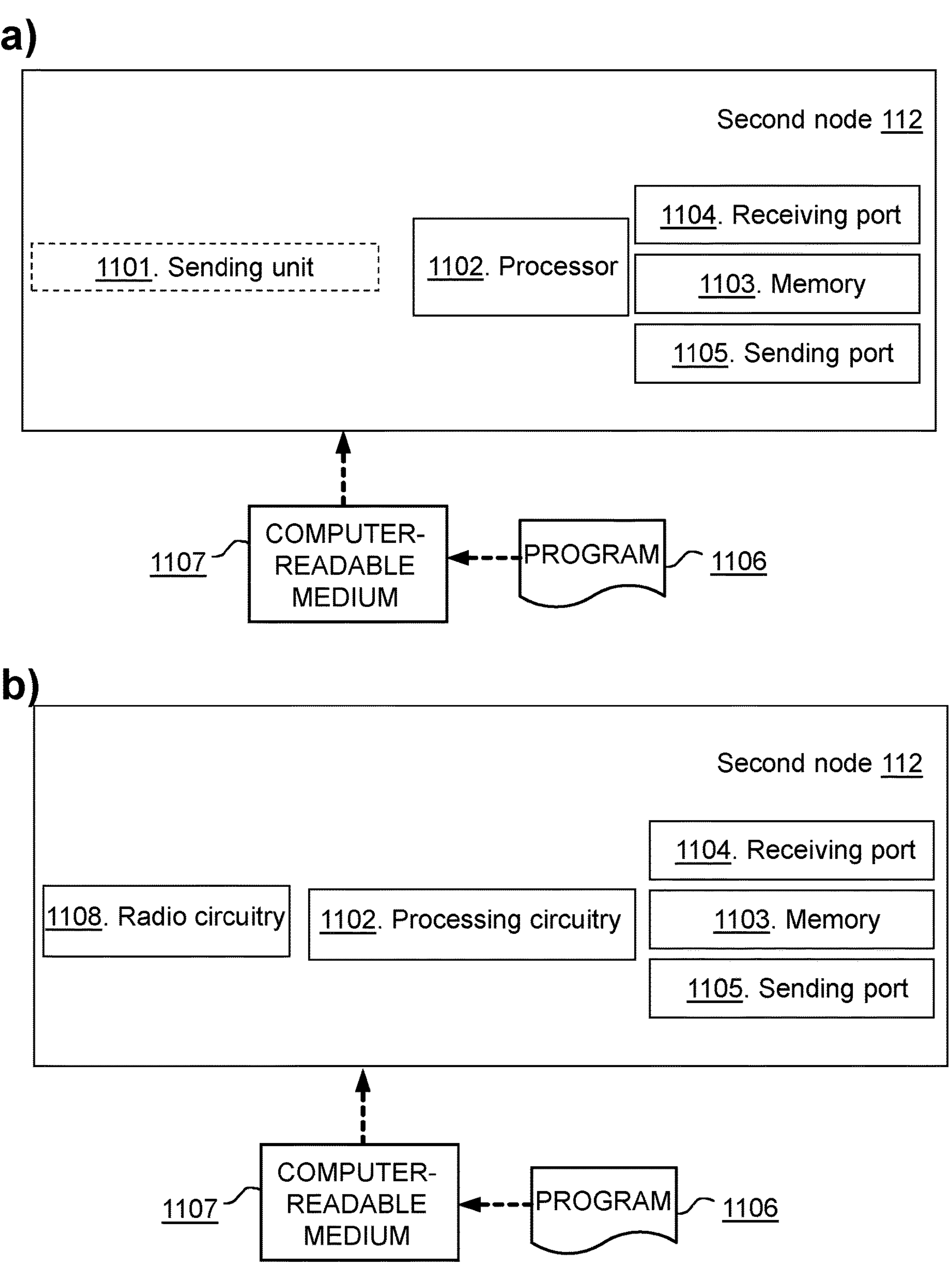
FIG. 11 is a schematic block diagram illustrating two non-limiting examples, a) and b), of a second node, according to embodiments herein.

FIG. 11 depicts two different examples in panels a) and b), respectively, of the arrangement that the second node 112 may comprise to perform the method actions described above in relation to FIG. 4, FIG. 6, FIG. 7, and/or FIG. 8. In some embodiments, the second node 112 may comprise the following arrangement depicted in FIG. 11*a*. The second node 112 may be understood to be configured to handle usage of a DNS server 121 in the communications network 100. The second node 112 may be configured to operate in the communications network 100.

Several embodiments are comprised herein. Components from one embodiment may be tacitly assumed to be present in another embodiment and it will be obvious to a person skilled in the art how those components may be used in the other exemplary embodiments. In FIG. 11, optional boxes are indicated by dashed lines. The detailed description of some of the following corresponds to the same references provided above, in relation to the actions described for the second node 112 and will thus not be repeated here. For example, the first node 111 the first node 111 may be configured to be a PCF, the another node 113 may be configured to be an AMF, and the second node 112 may be configured to be a UDR or a further node configured to operate in the communications network 100. The device 140 may be configured to be a UE.

The second node 112 is configured to, e.g. by means of a sending unit 1101 within the second node 112 configured to send, to the first node 111 configured to operate in the communications network 100, the one or more first indications. The one or more first indications are configured to indicate the one or more rules on how a device 140 configured to operate in the communications network 100 is to select, based the on one or more criteria, the DNS server 121, out of the one or more DNS servers 120, for use by the device 140 for the application. The one or more first indications are configured to comprise the explicit indication of one of: a) which applications the one or more rules apply to, and b) that the one or more rules apply to all applications.

The embodiments herein may be implemented through one or more processors, such as a processor 1102 in the second node 112 depicted in FIG. 11, together with computer program code for performing the functions and actions of the embodiments herein. The program code mentioned above may also be provided as a computer program product, for instance in the form of a data carrier carrying computer program code for performing the embodiments herein when being loaded into the in the second node 112. One such carrier may be in the form of a CD ROM disc. It is however feasible with other data carriers such as a memory stick. The computer program code may furthermore be provided as pure program code on a server and downloaded to the second node 112.

The second node 112 may further comprise a memory 1103 comprising one or more memory units. The memory 1103 is arranged to be used to store obtained information, store data, configurations, schedulings, and applications etc. to perform the methods herein when being executed in the second node 112.

In some embodiments, the second node 112 may receive information from, e.g., the first node 111, another node 113, the fourth node 614, the fifth node 615, the sixth node 616, the DNS server 121, any of the one or more DNS servers 120, and/or the device 140, through a receiving port 1104. In some examples, the receiving port 1104 may be, for example, connected to one or more antennas in the second node 112. In other embodiments, the second node 112 may receive information from another structure in the communications network 100 through the receiving port 1104. Since the receiving port 1104 may be in communication with the processor 1102, the receiving port 1104 may then send the received information to the processor 1102. The receiving port 1104 may also be configured to receive other information.

The processor 1102 in the second node 112 may be further configured to transmit or send information to e.g., the first node 111, another node 113, the fourth node 614, and the fifth node 615, the sixth node 616, the DNS server 121, any of the one or more DNS servers 120, the device 140, and/or another structure in the communications network 100, through a sending port 1105, which may be in communication with the processor 1102, and the memory 1103.

Those skilled in the art will also appreciate that the unit 1101 described above may refer to a combination of analog and digital circuits, and/or one or more processors configured with software and/or firmware, e.g., stored in memory, that, when executed by the one or more processors such as the processor 1102, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

The unit 1101 described above may be the processor 1102 of the second node 112, or an application running on such processor.

Thus, the methods according to the embodiments described herein for the second node 112 may be respectively implemented by means of a computer program 1106 product, comprising instructions, i.e., software code portions, which, when executed on at least one processor 1102, cause the at least one processor 1102 to carry out the actions described herein, as performed by the second node 112. The computer program 1106 product may be stored on a computer-readable storage medium 1107. The computer-readable storage medium 1107, having stored thereon the computer program 1106, may comprise instructions which, when executed on at least one processor 1102, cause the at least one processor 1102 to carry out the actions described herein, as performed by the second node 112. In some embodiments, the computer-readable storage medium 1107 may be a non-transitory computer-readable storage medium, such as a CD ROM disc, a memory stick, or stored in the cloud space. In other embodiments, the computer program 1106 product may be stored on a carrier containing the computer program, wherein the carrier is one of an electronic signal, optical signal, radio signal, or the computer-readable storage medium 1107, as described above.

The second node 112 may comprise an interface unit to facilitate communications between the second node 112 and other nodes or devices, e.g., the first node 111, another node 113, the fourth node 614, the fifth node 615, the sixth node 616, the DNS server 121, any of the one or more DNS servers 120, the device 140, and/or another structure in the communications network 100. In some particular examples, the interface may, for example, include a transceiver configured to transmit and receive radio signals over an air interface in accordance with a suitable standard.

In other embodiments, the second node 112 may comprise the following arrangement depicted in FIG. 11*b*. The second node 112 may comprise a processing circuitry 1102, e.g., one or more processors such as the processor 1102, in the second node 112 and the memory 1103. The second node 112 may also comprise a radio circuitry 1108, which may comprise e.g., the receiving port 1104 and the sending port 1105. The processing circuitry 1102 may be configured to, or operable to, perform the method actions according to FIG. 4, FIG. 6, FIG. 7 and/or FIG. 8, in a similar manner as that described in relation to FIG. 11*a*. The radio circuitry 1108 may be configured to set up and maintain at least a wireless connection with the first node 111, another node 113, the fourth node 614, and the fifth node 615, the sixth node 616, the DNS server 121, any of the one or more DNS servers 120, the device 140, and/or another structure in the communications network 100.

Hence, embodiments herein also relate to the second node 112 operative to handle usage of a DNS server 121 in the communications network 100, the second node 112 being operative to operate in the communications network 100. The second node 112 may comprise the processing circuitry 1102 and the memory 1103, said memory 1103 containing instructions executable by said processing circuitry 1102, whereby the second node 112 is further operative to perform the actions described herein in relation to the second node 112, e.g., in FIG. 4, FIG. 6, FIG. 7 and/or FIG. 8.

When using the word "comprise" or "comprising", it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

Any of the terms processor and circuitry may be understood herein as a hardware component.

As used herein, the expression "in some embodiments" has been used to indicate that the features of the embodiment described may be combined with any other embodiment or example disclosed herein.

As used herein, the expression "in some examples" has been used to indicate that the features of the example described may be combined with any other embodiment or example disclosed herein.

The invention claimed is:

1. A method, performed by a first node, for handling usage of a Domain Name Service (DNS) server in a communications network, the first node operative in the communications network, the method comprising:

obtaining one or more first indications, the one or more first indications indicating one or more rules on how a device operating in the communications network is to select, based on one or more criteria, a DNS server, out of one or more DNS servers, for use by the device for an application, wherein the one or more first indications comprise an explicit indication of one of: a) which applications the one or more rules apply to, and b) that the one or more rules apply to all applications; and sending a second indication to one of: another node operating in the communications network and the device, the second indication indicating the obtained one or more first indications;

wherein the second indication further indicates one or more of: an order of enforcement of the policy, and a type of traffic the policy applies to.

2. The method according to claim 1, wherein the one or more criteria comprise one or more of:

a. the application for which the device is to instantiate the DNS server;

b. whether or not the application is for edge computing;

c. a first location of the device;

d. a second location of the DNS server;

e. a type of slice instantiated for the use of the DNS server by the device; and f. a Radio Access Technology to be used by the device to run the application.

3. The method according to claim 1, wherein the one or more first indications indicate one or more of:

a. an address of the DNS server;

b. whether or not the DNS server supports encryption;

c. whether or not the DNS server supports filtering;

d. a type of filtering supported by the DNS server; and e. a second location of the DNS server.

4. The method according to claim 1, wherein the one or more first indications indicate a policy.

5. The method according to claim 1, the method further comprising:

selecting the DNS server, out of the one or more DNS servers, for use by the device for the application, the selecting being based on the indicated one or more first indications, and wherein the second indication indicates the selected DNS server.

6. The method according to claim 5, the method further comprising:

sending a query to the selected DNS server based on an address of the application; and determining whether or not to select another DNS server, based on whether or not a response to the query is received from the selected DNS server.

7. The method according to claim 1, wherein the one or more first indications are obtained from a second node operating in the communications network.

8. The method according to claim 7, wherein the first node is a Policy Charging Function (PCF) the another node is an AMF, and the second node is a UDR or a further node operating in the communications network.

9. A method, performed by a device, for handling usage of a Domain Name Service (DNS) server in a communications network, the device operating in the communications network, the method comprising:

receiving, from a first node operating in the communications network, a second indication, the second indication indicates one or more first indications indicating one or more rules on how a device is to select, based on a one or more criteria, a DNS server, out of one or more DNS servers, for use by the device for an application, wherein the second indication comprises an explicit indication of one of: a) which applications the one or more rules apply to, and b) that the one or more rules apply to all applications;

wherein the second indication further indicates one or more of: an order of enforcement of the policy, and a type of traffic the policy applies to; and selecting the DNS server, out of the one or more DNS servers, for use by the device for the application, the selecting being based on the received second indication.

10. A method, performed by a second node, for handling usage of a Domain Name Service (DNS) server in a communications network, the second node operating in the communications network, the method comprising:

sending, to a first node operating in the communications network, one or more first indications, the one or more first indications indicating one or more rules on how a device operating in the communications network is to select, based on one or more criteria, a DNS server, out of one or more DNS servers, for use by the device for an application, wherein the one or more first indications comprise an explicit indication of one of: a) which applications the one or more rules apply to, and b) that the one or more rules apply to all applications;

wherein the first indications further indicates one or more of: an order of enforcement of the policy, and a type of traffic the policy applies to.

11. A first node, for handling usage of a Domain Name Service (DNS) server in a communications network, the first node being configured to operate in the communications network, the first node being further configured to:

obtain one or more first indications, the one or more first indications being configured to indicate one or more rules on how a device configured to operate in the communications network is to select, based on one or more criteria, a DNS server, out of one or more DNS servers, for use by the device for an application, wherein the one or more first indications are configured to comprise an explicit indication of one of: a) which applications the one or more rules apply to, and b) that the one or more rules apply to all applications; and send a second indication to one of: another node configured to operate in the communications network and the device, the second indication being configured to indicate the one or more first indications configured to be obtained wherein the second indication further indicates one or more of: an order of enforcement of the policy, and a type of traffic the policy applies to.

12. The first node according to claim 11, wherein the one or more criteria are configured to comprise one or more of:

a. the application for which the device is to instantiate the DNS server;

b. whether or not the application is for edge computing;

c. a first location of the device;

d. a second location of the DNS server;

e. a type of slice configured to be instantiated for the use of the DNS server by the device; and f. a Radio Access Technology configured to be to be used by the device to run the application.

13. The first node according to claim 11, wherein the one or more first indications are configured to indicate one or more of:

a. an address of the DNS server;

b. whether or not the DNS server supports encryption;

c. whether or not the DNS server supports filtering;

d. a type of filtering configured to be supported by the DNS server; and e. a second location of the DNS server.

14. The first node according to claim 11, wherein the one or more first indications are configured to indicate a policy.

15. The first node according to claim 11, being further configured to:

select the DNS server, out of the one or more DNS servers, for use by the device for the application, the selecting being configured to be based on the one or more first indications configured to be indicated, and wherein the second indication is configured to indicate the selected DNS server.

16. The first node according to claim 15, being further configured to:

send a query to the DNS server configured to be selected based on an address of the application; and determine whether or not to select another DNS server, based on whether or not a response to the query is received from the DNS server configured to be selected.

17. The first node according to claim 11, wherein the one or more first indications are configured to be obtained from a second node configured to operate in the communications network.

18. The first node according to claim 17, wherein the first node is configured to be a Policy Charging Function, PCF, the another node is configured to be an AMF, and the second node is configured to be a UDR or a further node configured to operate in the communications network.

19. A device, for handling usage of a Domain Name Service (DNS) server in a communications network, the device being configured to operate in the communications network, the device being further configured to:

receive, from a first node configured to operate in the communications network, a second indication, the second indication being configured to indicate one or more first indications configured to indicate one or more rules on how a device is to select, based on one or more criteria, a DNS server, out of one or more DNS servers, for use by the device for an application, wherein the second indication is configured to comprise an explicit indication of one of: a) which applications the one or more rules apply to, and b) that the one or more rules apply to all applications;

wherein the second indication further indicates one or more of: an order of enforcement of the policy, and a type of traffic the policy applies to; and select the DNS server, out of the one or more DNS servers, for use by the device for the application, the selecting being configured to be based on the second indication configured to be received.

20. A second node, for handling usage of a Domain Name Service (DNS) server in a communications network, the second node being configured to operate in the communications network, the second node being further configured to:

send, to a first node configured to operate in the communications network, one or more first indications, the one or more first indications being configured to indicate one or more rules on how a device configured to operate in the communications network is to select, based on one or more criteria, a DNS server, out of one or more DNS servers, for use by the device for an application, wherein the one or more first indications are configured to comprise an explicit indication of one of: a) which applications the one or more rules apply to, and b) that the one or more rules apply to all applications;

wherein the first indications further indicate one or more of: an order of enforcement of the policy, and a type of traffic the policy applies to.

* * * * *